(12) United States Patent
Sameer

(10) Patent No.: US 12,158,353 B2
(45) Date of Patent: Dec. 3, 2024

(54) SYSTEM AND METHOD FOR DETERMING A ROOFTOP TYPE

(71) Applicant: HERE Global B.V., Eindhoven (NL)

(72) Inventor: Priyank Sameer, Mumbai Maharashtra (IN)

(73) Assignee: HERE Global B.V., Eindhoven (NL)

(*) Notice: Subject to any disclaimer, the term of this patent is extended or adjusted under 35 U.S.C. 154(b) by 227 days.

(21) Appl. No.: 17/968,576

(22) Filed: Oct. 18, 2022

(65) Prior Publication Data

US 2024/0125615 A1    Apr. 18, 2024

(51) Int. Cl.

| | |
|---|---|
| *G06V 20/17* | (2022.01) |
| *B64C 39/02* | (2023.01) |
| *G01C 21/00* | (2006.01) |
| *G05D 1/00* | (2006.01) |
| *G06V 10/764* | (2022.01) |
| *G06V 10/774* | (2022.01) |
| *B64U 101/60* | (2023.01) |

(52) U.S. Cl.
CPC ........ *G01C 21/3807* (2020.08); *B64C 39/024* (2013.01); *G01C 21/3848* (2020.08); *G01C 21/3859* (2020.08); *G05D 1/101* (2013.01); *G06V 10/764* (2022.01); *G06V 10/774* (2022.01); *G06V 20/17* (2022.01); *B64U 2101/60* (2023.01)

(58) Field of Classification Search
CPC ............ G01C 21/3807; G01C 21/3859; G01C 21/3848; G06V 20/17; G06V 10/774; G06V 10/764; B64C 39/024; G05D 1/101; B64U 2101/60

See application file for complete search history.

(56) References Cited

U.S. PATENT DOCUMENTS

| | | |
|---|---|---|
| 8,996,207 B2 | 3/2015 | Goossen et al. |
| 9,892,646 B2 | 2/2018 | Stathis |
| 10,061,470 B2 | 8/2018 | Richman et al. |
| 10,102,428 B2 | 10/2018 | Loveland et al. |
| 2020/0349852 A1 | 11/2020 | Dicosola |

OTHER PUBLICATIONS

Castagno et al., "Comprehensive risk-based planning for small unmanned aircraft system rooftop landing", 2018, 10 pages.
Gonzalez et al., "Rooftop-place suitability analysis for urban air mobility hubs: A GIS and neural network approach", Feb. 27, 2020, 109 pages.
Castagno et al., "Realtime rooftop landing site identification and selection in urban city simulation", Mar. 9, 2019, 8 pages.

*Primary Examiner* — Mathew Franklin Gordon
(74) *Attorney, Agent, or Firm* — DITTHAVONG, STEINER, & MLOTKOWSKI

(57) ABSTRACT

A system, a method, and a computer program product may be provided for determining a rooftop type. The system may be configured to obtain location information associated with a UAV, and obtain a first set of images and building data associated with a building in proximity of the UAV based on the location information. The system is configured to extract a set of rooftop features for a rooftop of the building using the first set of images and the building data. The set of rooftop features comprises at least a rooftop type and a durability parameter for the rooftop. The system is configured to store the set of rooftop features in conjunction with the building data for the building in a map database.

20 Claims, 7 Drawing Sheets

SYSTEM AND METHOD FOR DETERMING A ROOFTOP TYPE

TECHNOLOGICAL FIELD

The present disclosure generally relates to determining a rooftop type. More particularly, the present disclosure relates to determining safe landing spots on rooftops, based on rooftop type, for facilitating landing of unmanned aerial vehicles (UAVs).

BACKGROUND

Unmanned aerial vehicles (UAVs) may be used across the world for civilian, commercial, and military applications. Examples of applications of the UAVs may include, but are not limited to, aerial photography, last mile delivery, mapping and surveying, roof inspections, emergency response, search and rescue, and aviation. During operation, the UAVs may have to land on surfaces, such a rooftop of a building. Such landing may be performed for completing an operation or for conserving energy of the UAVs during its operation.

However, landing of a UAV on a rooftop may be prone to risks. For example, the rooftop may not be able to withstand the weight of the UAV. As a result, the rooftop may collapse, thereby causing considerable property damage. This may be highly undesirable. Therefore, UAVs may require information for safe landing on rooftops.

BRIEF SUMMARY

A system, a method, and a computer program product are provided herein that describe determining a rooftop type of a rooftop. In one aspect, the system for determining the rooftop type of the rooftop may be provided. The system may include a memory configured to store computer executable instructions; and one or more processors (hereinafter referred as processor) configured to execute the instructions to obtain location information associated with the UAV. In accordance with an embodiment, the processor may be configured to obtain a first set of images and building data associated with a building in proximity of the UAV based on the location information. In accordance with an embodiment, the processor may be configured to extract a set of rooftop features for a rooftop of the building using the first set of images and the building data. The set of rooftop features includes at least a rooftop type and a durability parameter for the rooftop. In accordance with an embodiment, the processor may be configured to store the set of rooftop features in conjunction with the building data for the building in a map database.

According to some example embodiments, the processor may be configured to obtain a set of UAV attributes associated with the UAV, and determine a classification label for one or more landing spots on the rooftop of the building for facilitating the landing of the UAV on the rooftop based on the set of UAV attributes and the updated map database.

According to some example embodiments, the processor is further configured to provide the updated map database comprising the set of rooftop features for the rooftop of the building to the UAV. In accordance with an embodiment, the processor may be configured to cause the UAV to assign a classification label to each of one or more landing spots on the rooftop.

According to some example embodiments, the processor is further configured to cause the UAV to identify one or more safe landing spots on the rooftop, based on the classification label, and generate navigation instructions for facilitating landing of the UAV on a safe landing spot from the one or more safe landing spots.

According to some example embodiments, the classification label comprises at least one of: a safe landing zone, a risky landing zone, or a no landing zone.

According to some example embodiments, the processor may be further configured to obtain consent information pertaining to landing of the UAV on the rooftop of the building and determine the one or more landing spots on the rooftop, based on the consent information.

According to some example embodiments, the processor may be further configured to determine one or more construction materials used for construction of one or more parts of the rooftop based on the first set of images and the building data. In accordance with an embodiment, the processor may be further configured to identify the rooftop type of the rooftop, based on the one or more construction materials.

According to some example embodiments, the processor may be further configured to obtain a set of durability features corresponding to the one or more construction materials of the rooftop. In accordance with an embodiment, the processor may be further configured to determine the durability parameter for the one or more parts of the rooftop of the building, based on the one or more construction materials used for construction of the one or more parts of the rooftop and the set of durability features.

According to some example embodiments, the building data includes at least one of: building location, building outline, building shape, building feature type, building roof type information, building shadows, building courtyard information, building blueprint, and building identifier.

According to some example embodiments, the processor may be further configured to extract the set of rooftop features for the rooftop of the building from the first set of images and the building data, using a trained machine learning model.

According to some example embodiments, the processor may be further configured to identify one or more objects present on the rooftop of the building using the first set of images and the trained machine learning model, determine a set of object attributes associated with the one or more objects using the building data, the first set of images and the trained machine learning model, and determine updated durability parameter for the rooftop of the building, based on the set of object attributes.

According to some example embodiments, the processor may be further configured to receive training data relating to one or more rooftops, determine a plurality of features corresponding to one or more parts of the one or more rooftops using the training data, and train the machine learning model to identify a rooftop type and a durability parameter for each of one or more unlabeled test samples using the plurality of features and the training data. In accordance with an embodiment, the plurality of features may indicate rooftop type and durability parameter associated with the one or more rooftops.

According to some example embodiments, the UAV is configured to capture the first set of images of the building during a corresponding operation, using an imaging source associated therewith.

Embodiments disclosed herein may provide a method for determining a rooftop type of a rooftop. The method may include obtaining location information associated with a UAV. The method may include obtaining a first set of images and building data associated with a building in proximity of the UAV, based on the location information. The method may include extracting a set of rooftop features for a rooftop of the building, using the first set of images and the building data. The set of rooftop features includes at least a rooftop type and a durability parameter for the rooftop. The method may include storing the set of rooftop features in conjunction with the building data for the building in a map database.

According to some example embodiments, the method further comprises obtaining a set of UAV attributes associated with the UAV. In accordance with an embodiment, the method further comprises determining a classification label for one or more landing spots on the rooftop of the building for facilitating the landing of the UAV on the rooftop, based on the set of UAV attributes and the updated map database, wherein the classification label comprises at least one of: a safe landing zone, a risky landing zone, or a no landing zone.

According to some example embodiments, the method further comprises providing the updated map database comprising the set of rooftop features for the rooftop of the building to the UAV. In accordance with an embodiment, the method further comprises causing the UAV to assign a classification label to each of one or more landing spots on the rooftop, wherein the classification label comprises at least one of: a safe landing zone, a risky landing zone, or a no landing zone. In accordance with an embodiment, the method further comprises causing the UAV to identify one or more safe landing spots on the rooftop, based on the classification label. In accordance with an embodiment, the method further comprises generating navigation instructions for facilitating landing of the UAV on a safe landing spot from the one or more safe landing spots.

According to some example embodiments, the method further comprises obtaining consent information pertaining to landing of the UAV on the building. In accordance with an embodiment, the method further comprises determining the one or more landing spots on the rooftop of the building based on the consent information. In accordance with an embodiment, the method further comprises determining a nearest safe landing spot from the one or more landing spots nearest to a current location of the UAV. In accordance with an embodiment, the method further comprises generating navigation instructions to facilitate landing of the UAV to land on the nearest safe landing spot.

According to some example embodiments, the method further comprises determining one or more construction materials used for construction of one or more parts of the rooftop based on the first set of images and the building data. In accordance with an embodiment, the method further comprises identify the rooftop type of the rooftop, based on the one or more construction materials. In accordance with an embodiment, the method further comprises obtaining a set of durability features corresponding to the one or more construction materials of the rooftop. In accordance with an embodiment, the method further comprises determining the durability parameter for the one or more parts of the rooftop of the building, based on the one or more construction materials used for construction of the one or more parts and the set of durability features.

According to some example embodiments, the method further comprises identifying one or more objects present on the rooftop of the building using the first set of images and a trained machine learning model, determining a set of object attributes associated with the one or more objects using the building data, the first set of images and the trained machine learning model, and determining updated durability parameter for the rooftop of the building based on the set of rooftop features and the set of object attributes.

Embodiments of the present disclosure may provide a computer programmable product including a non-transitory computer-readable medium having stored thereon computer-executable instructions, which when executed by one or more processors, cause the one or more processors to carry out operations for determining a rooftop type of a rooftop. The operations include obtaining a set of UAV attributes location information associated with the UAV. The operations include obtaining a first set of images and building data associated with a building in proximity of the UAV, based on the location information. The operations include extracting a set of rooftop features for a rooftop of the building, using the first set of images and the building data. The set of rooftop features includes at least a rooftop type and a durability parameter for the rooftop. The operations include storing the set of rooftop features in conjunction with the building data for the building in a map database. The operations include determining a classification label for one or more landing spots on the rooftop of the building for facilitating the landing of the UAV on the rooftop, based on the set of UAV attributes and the set of rooftop features.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Figure 1:
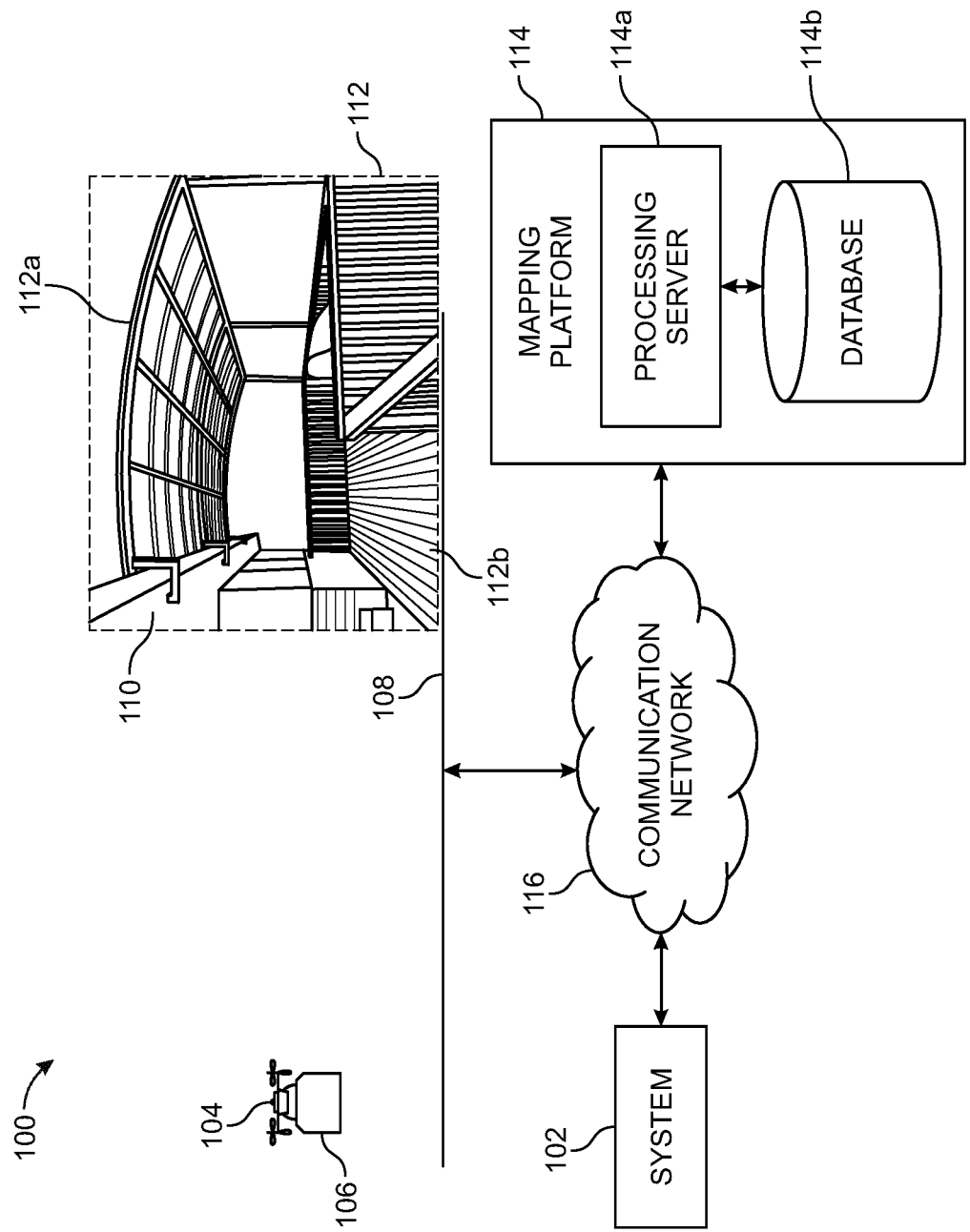
Figure 2:
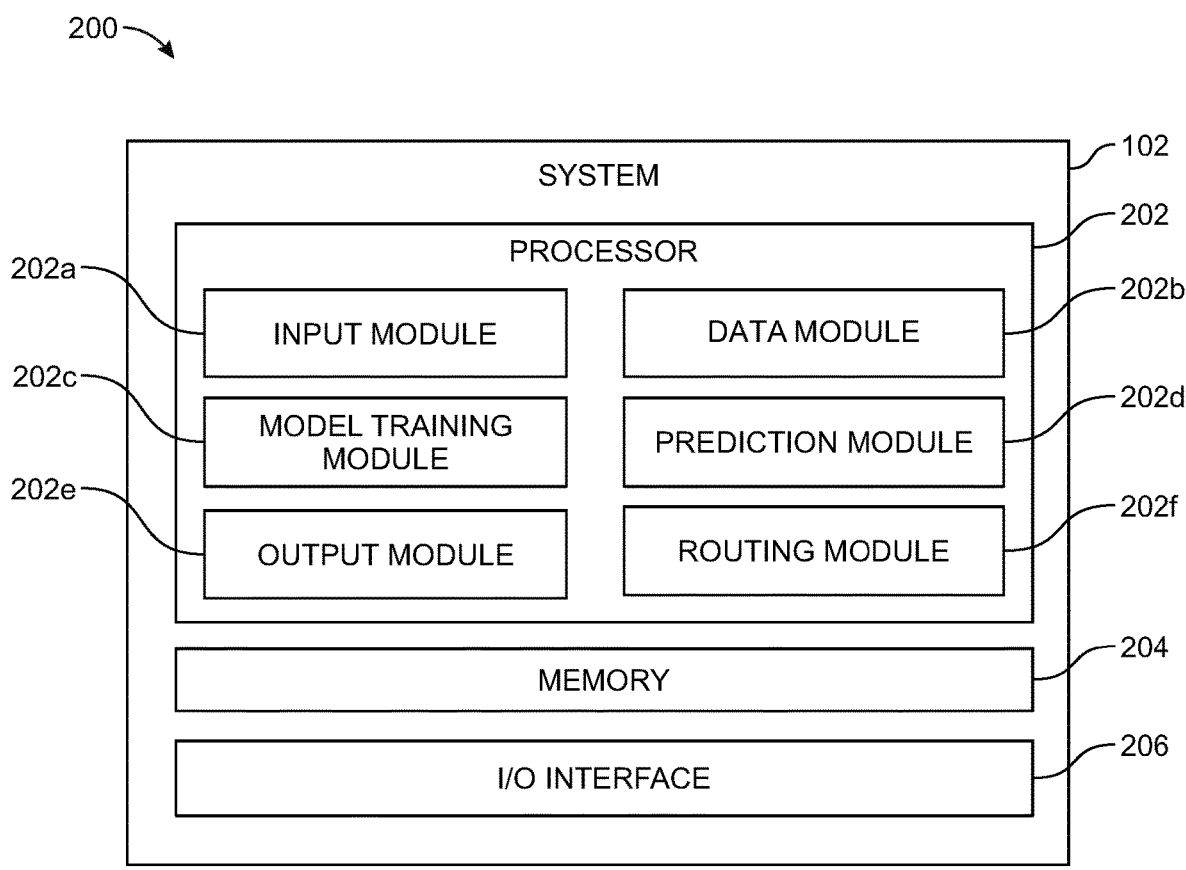
Figure 3:
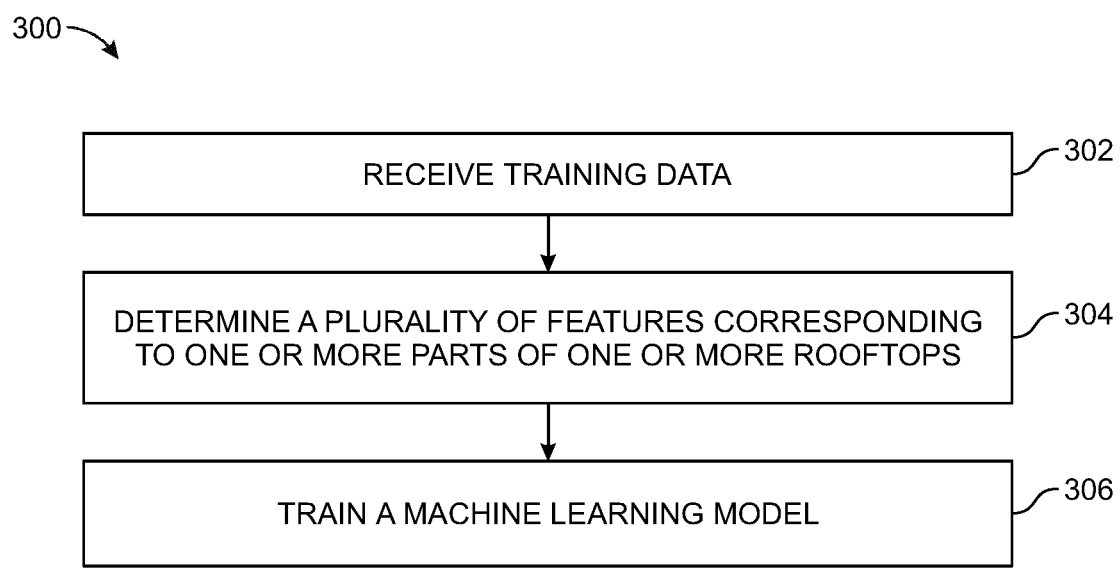
Figure 4A:
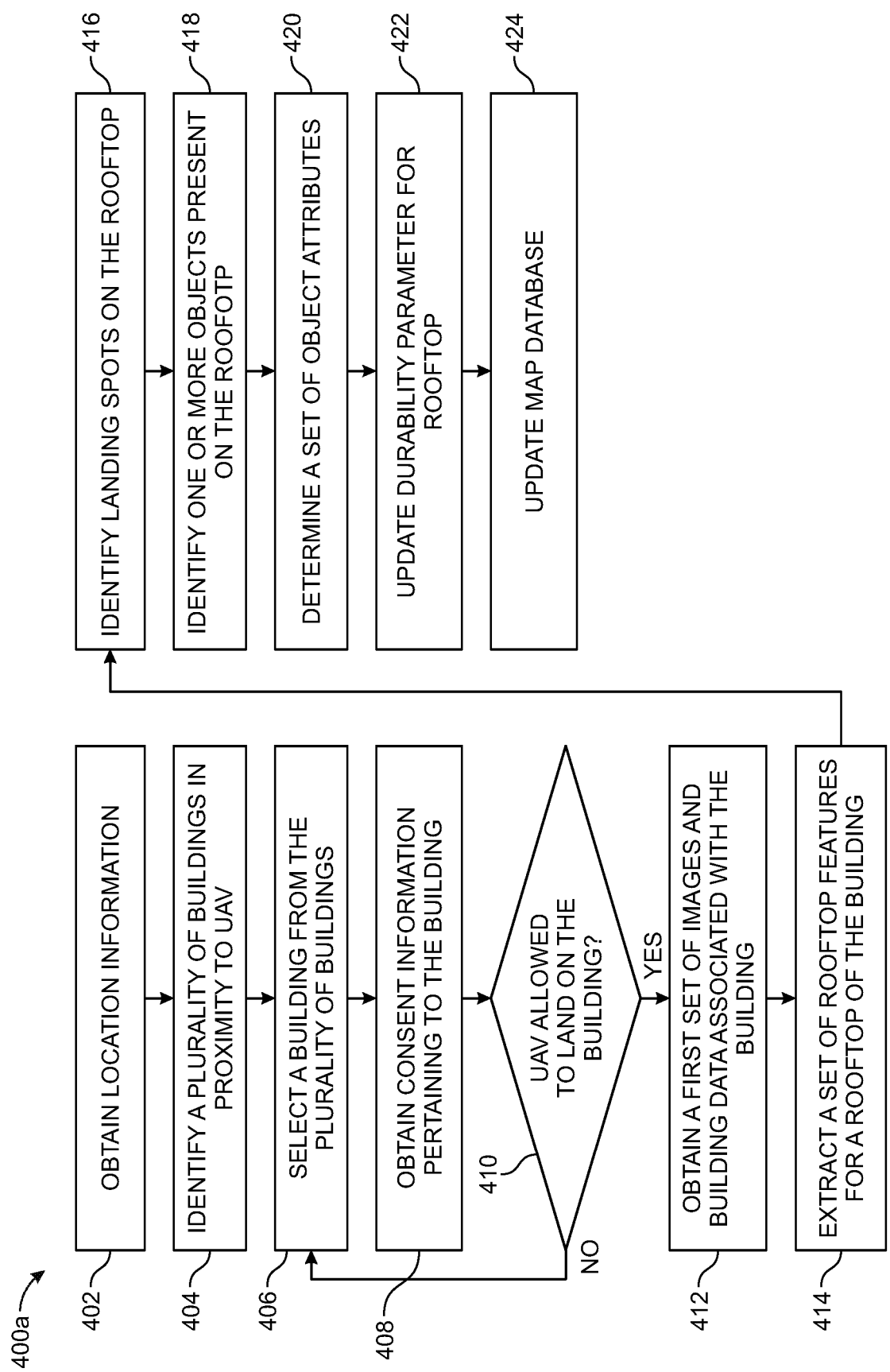
Figure 4B:
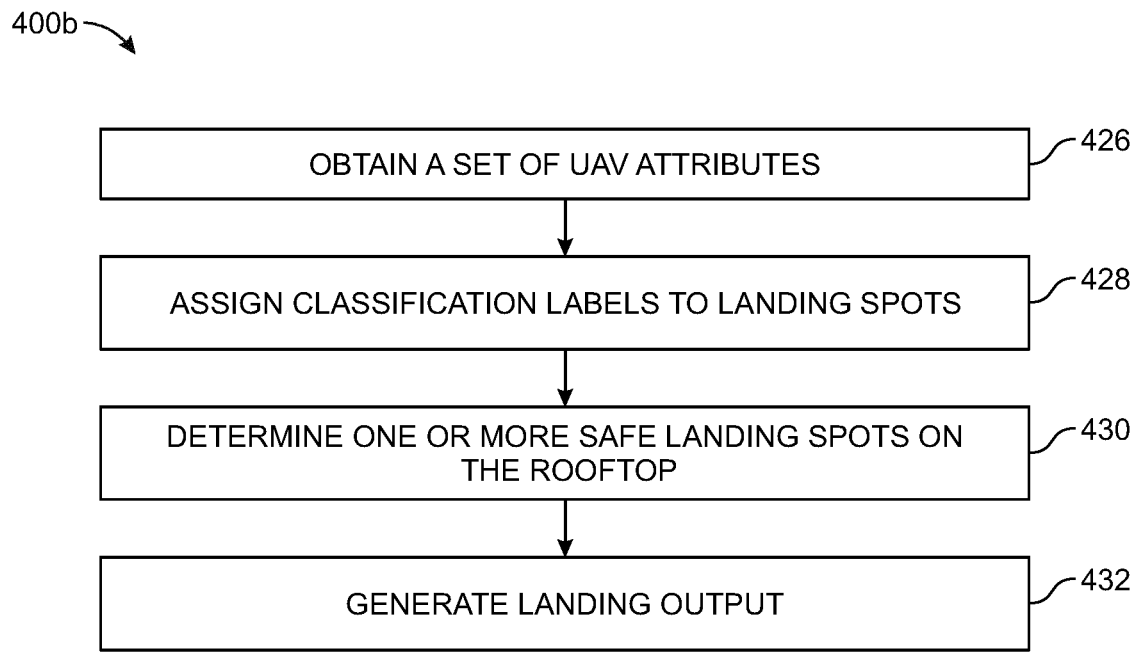
Figure 5:
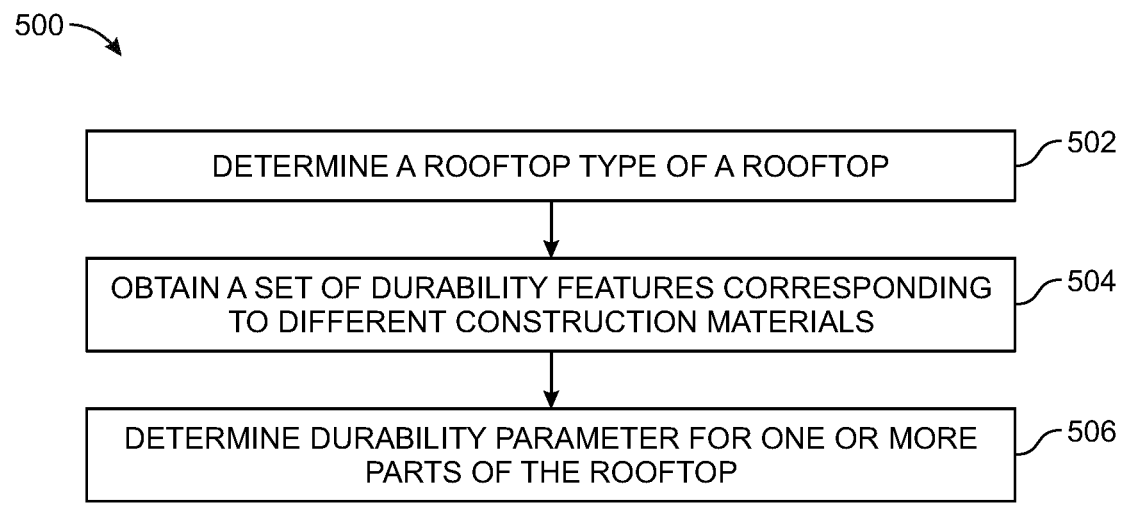
Figure 6:
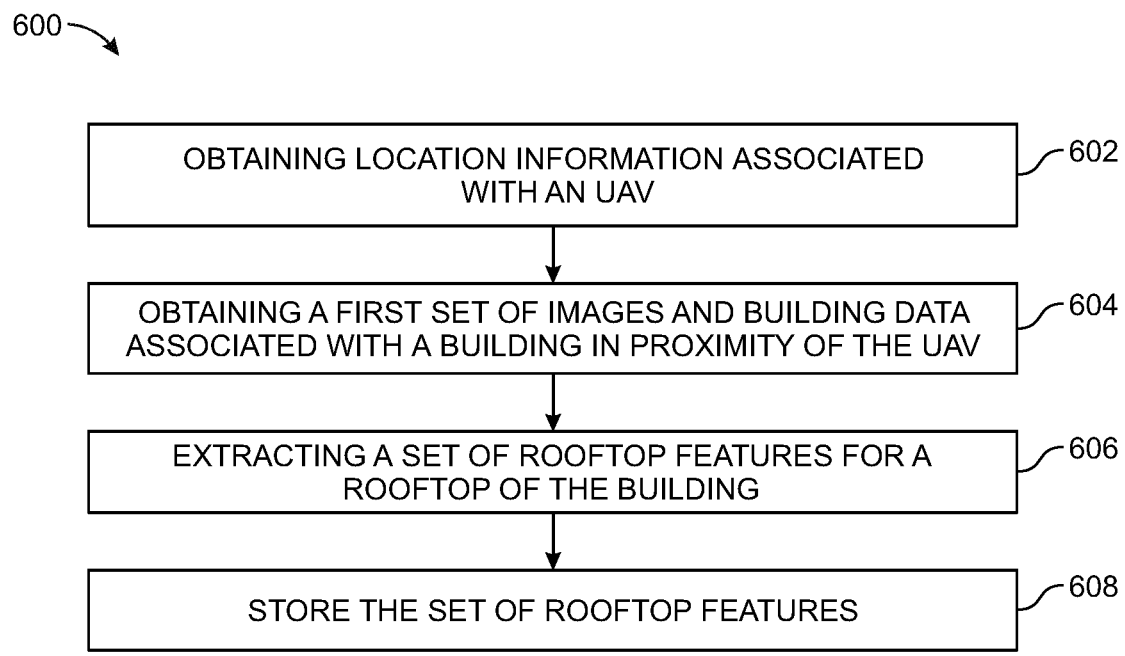

Having thus described example embodiments of the disclosure in general terms, reference will now be made to the accompanying drawings, which are not necessarily drawn to scale, and wherein:

FIG. 1 is a diagram that illustrates an environment of a system implemented for determining a rooftop type of a rooftop, in accordance with an example embodiment;

FIG. 2 illustrates a block diagram of a system for determining a rooftop type of a rooftop, in accordance with an example embodiment;

FIG. 3 illustrates a flowchart for implementation of an exemplar method for training a machine learning model for facilitating landing of an unmanned aerial vehicle (UAV), in accordance with an example embodiment;

FIG. 4A illustrates a flowchart for implementation of an exemplar method for determining rooftop type of the rooftop, in accordance with an embodiment;

FIG. 4B illustrates a flowchart for implementation of an exemplar method for determining rooftop type of the rooftop for landing the UAV, in accordance with an embodiment;

FIG. 5 illustrates a flowchart for implementation of an exemplar method for extracting a set of rooftop features for a rooftop, in accordance with an embodiment; and FIG. 6 illustrates an example flowchart for implementation of an exemplar method for facilitating landing of a UAV, in accordance with an embodiment.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, systems and methods are shown in block diagram form only in order to avoid obscuring the present disclosure.

Definitions

The term "unmanned aerial vehicle" or UAV may refer to an automotive vehicle that may use one or more electric motors for propulsion above ground surface, i.e., in air. In an example, the electric motors may be powered or propelled by electricity from extravehicular sources or a battery system. In an example, the UAV may use a traction battery pack to power the electric motor. For example, the battery pack may be plugged to a power outlet or a charging equipment, for charging. For example, the UAV may include charging port, battery pack, converters, one or more electric motors, charger, controller, cooling system, and transmission connects. In an example, the UAV may be a drone.

The term "building" may refer to a structure having a roof and walls. In an example, a building may be a permanent structure. In an example, the building may be a point of interest (POI) building, such as a hospital, a residential complex, a shopping complex, a factory, a government building, and so forth. Further, the term "rooftop" may refer to an outer surface of a roof of a building. The rooftop of a building may be an open space on top of a building. In certain cases, the rooftop of a building may be fully or partially enclosed by a roofing sheet. The roofing sheet may be made of, for example, galvanized steel, polyester, metal, bitumen, aluminum, polycarbonate, polyvinyl chloride (PVC), galvanized iron plastic, rubber, fabric reinforced plastic, and so forth.

The term "machine learning model" may refer to an engine or a set of engines that are configured to find patterns and make predictions or decisions, based on input data. For example, a machine learning (ML) model may include a vector of coefficients (data) that are multiplied and summed with a row of new data taken as input in order to make a prediction (prediction output). Examples of machine learning (ML) model may include, but are not limited to, linear regression models, classification models, deep neural networks, decision trees, random forests, and graphic models.

The term "route" may refer to a planned or a developed path that may be used by a vehicle to reach from one point to another point. The route may include, for example, roads, lanes, links, air space, and so forth.

The term "cargo" refers to all types of items and/or packaging suitable for delivery or carrying and may be known by other terms including but not limited to object, freight, payload, goods, package, parcel, box, bag, shrink-wrap, blister pack, electronic device, or some combination thereof.

End of Definitions

A system, a method, and a computer program product are provided herein in accordance with an example embodiment for determining a rooftop type of a rooftop. Based on the determined rooftop type of the rooftop, landing of an unmanned aerial vehicle (UAV) may be facilitated. The system, the method, and the computer program product disclosed herein enables reliable and safe landing of the UAV on a rooftop of a building, thereby preventing damage to the UAV in case of an unforeseeable failure of the UAV and/or damage to the rooftop on which the UAV lands. The system, the method, and the computer program product disclosed herein enables safe landing of the UAV on a rooftop that can withstand a load of the UAV reliably. Specifically, the system, the method, and the computer program product disclosed herein prevent damage to rooftop structures owing to landing of heavy UAVs on the rooftops.

In an example, the system, the method, and the computer program product disclosed herein may be configured to identify and provide locations of buildings, specifically, rooftops, associated with various rooftop types. Such classification of one or more parts of various rooftops based on associated rooftop type may be used by aerial logistics companies for landing UAVs in an efficient manner. Moreover, other operations of UAVs, such as delivery, aerial landscaping, aerial photography, surveillance, etc. may be performed more effectively as the UAV may land on a safe landing spot on a rooftop thereby saving battery charge during due course of operation. In addition, rooftop type classification may be used for planning smart city efficiently.

FIG. 1 is a diagram that illustrates an environment 100 comprising a system implemented for determining a rooftop type of a rooftop, according to some embodiments. In accordance with an example, the UAV 104 may be an aerial vehicle (e.g., aerial drones, or any other type of remotely operated or autonomous aerial vehicle). To this end, the use of an aerial vehicle may be widespread for services, such as last-mile package delivery, surveillance, aerial photography, etc. For example, the UAV 104 may have to deliver a cargo. Use of the UAV 104 for delivery may provide economic benefits, convenience, and delivery of time-critical goods and services to difficult-to-reach places.

However, operational performance of unmanned aerial vehicles (UAVs), for example, drones, is limited. In particular, capacity of a battery of the UAVs may be limited owing to weight limitations. Subsequently, the UAVs may have to conserve battery during operation. In certain cases, an operation to be performed by a UAV may be distributed over a time period. To this end, the UAVs may land on rooftops to conserve battery charge or energy, for example, during down-time or break time. In certain cases, the UAVs may encounter unforeseeable conditions, such as bad weather conditions, failure or fault in the UAV, and the like. Under such conditions, the UAVs may need to land on nearest rooftops to avoid any damage.

Typically, the UAVs may land securely and uninterruptedly on rooftops. However, for landing the UAVs on rooftops of buildings, safe landing spots may have to be recognized on the rooftops. In an example, a safe landing spot may be a landing spot that is capable of handling weight of the UAV and has no other objects that may damage or cause any harm to the UAV.

In certain cases, a rooftop or a part of a rooftop may be made of less durable material, such as glass. In other cases, a rooftop may have an extension on the rooftop, such as an extended shed, that fully or partially covers the rooftop. Such extensions may be made of less durable material, such as fiber reinforced plastic, polyester, polyvinyl chloride, plastic, rubber, fabric, and so forth. To this end, the landing of the UAVs on rooftops made of less durable material or extensions of the rooftops may be risky and may cause the less durable rooftops or the extensions to collapse. In certain cases, the UAVs may also get damaged due to the collapsing of the rooftops or extensions.

In an example, the rooftops or the extensions may be durable for landing of UAVs, i.e., may be capable of handling weight of a UAV. However, such rooftops or extensions may be already bearing load of certain other objects placed on the rooftops or extensions. Examples of such other objects may include, but are not limited to, water tanks, heating and/or chilling plants, water treatment plants, rooftop solar plant, and terrace garden. As a result, the rooftops or extensions may fail to withstand weight of the UAVs landing on it, thereby causing damage to the rooftops or extensions. This may cause great inconvenience and potential life threat for people living in the buildings. Such inconvenience may further make individuals of buildings skeptical about giving consent for landing of UAVs on rooftops. Therefore, service providers may face significant technical challenges to find safe landing spots on rooftops and optimize landing of UAVs to ensure successful operation in light of varying rooftop constructions and weights of UAVs.

Pursuant to embodiments of present disclosure, techniques for facilitating landing of a UAV are disclosed. In particular, the UAV may have to land on the rooftop for conserving energy, avoid turbulence due to bad weather condition, avoid failure due to certain fault, etc. Once resolved or re-triggered, the UAV may take off from the rooftop to resume its operation, return to source, or perform any other operation. In this manner, operational time of the UAV may be enhanced. It may be noted, the UAV may incur certain cost, such as time, battery charge, etc., during a landing. However, in case of unsafe landing spot, i.e., when the UAV fails to safely land, the cost associated with the landing may be wasted. As a result, operational time and operational performance of the UAV may further decrease. Therefore, it is crucial to find safe landing spots for the UAV before actual landing.

Throughout the present disclosure, the term "unmanned aerial vehicle" is used interchangeably with "drones". This should not be construed as a limitation. Further, the term "rooftops" may include rooftops having extensions and rooftops without extensions, unless specified otherwise.

Generally, the UAV 104 may operate relative to (e.g., above, under, though, in, around, etc.) a ground 108, and/or over rooftops. In one embodiment, the rooftop may be geo-referenced to become geo-referenced rooftops, wherein the geo-referenced rooftops may have an open rooftop area for landing of UAVs related to corresponding geographic coordinates and/or corresponding land or ground space. For example, the geo-referenced rooftops may be identified based on corresponding geographic coordinates (e.g., latitude and longitude) along with corresponding altitudes describing an airspace volume associated with the geographic coordinates. By way of example, the UAV 104 is carrying an object 106. In an example, the object 106 may be a cargo for delivery, an imaging device for surveillance or aerial photography, and so forth.

As shown in FIG. 1, the environment 100 may include the system 102, the UAV 104 carrying the cargo 106, a building 110 having a rooftop 112, and a mapping platform 114. The mapping platform 114 may further include a processing server 114a and a database 114b. In an example, the UAV 104 may include one or more sensors, a user equipment and/or a communication interface (not shown in the FIG. 1). Additional, fewer, or different components may be provided. For example, a proxy server, a name server, a map server, a cache server or cache network, a router, a switch or intelligent switch, a database, additional computers or workstations, administrative components, such as an administrative workstation, a gateway device, a backbone, ports, network connections, and network interfaces may be provided. While the components in FIG. 1 are shown as separate from one another, one or more of these components may be combined. In this regard, the system 102 may be communicatively coupled to the components shown in FIG. 1 to carry out the desired operations and wherever required modifications may be possible within the scope of the present disclosure.

To address the above-mentioned technical challenges, the system 102 of FIG. 1 introduces a capability to determine a rooftop type of the rooftop 112. A manner in which the system 102 determines the rooftop type of the rooftop and addresses the technical challenges is described in detail in conjunction with the figures of the present disclosure.

All the components in the environment 100 may be coupled directly or indirectly to the network 116. The components described in the environment 100 may be further broken down into more than one component and/or combined together in any suitable arrangement. Further, one or more components may be rearranged, changed, added, and/or removed.

The mapping platform 114 may comprise suitable logic, circuitry, and interfaces that may be configured to store geographic data indicating one or more geographic attributes associated with geographic regions having buildings and rooftops, such as the rooftop 112 of the building 110. The mapping platform 114 may also be configured to store map data indicating one or more location information associated with the UAV 104 and associated with the geographic regions.

The mapping platform 114 may include techniques related to, but not limited to, geocoding, routing (multimodal, intermodal, and unimodal), clustering algorithms, machine learning in location based solutions, natural language processing algorithms, and artificial intelligence algorithms. Data for different modules of the mapping platform 114 may be collected using a plurality of technologies including, but not limited to drones, sensors, connected cars, cameras, probes, and chipsets. In some embodiments, the mapping platform 114 may be embodied as a chip or chip set. In other words, the mapping platform 114 may comprise one or more physical packages (such as, chips) that includes materials, components and/or wires on a structural assembly (such as, a baseboard).

In some example embodiments, the mapping platform 114 may include the processing server 114a for carrying out the processing functions associated with the mapping platform 114 and the database 114b for storing data. In an embodiment, the processing server 114a may comprise one or more processors configured to process requests received from the system 102. The processors may fetch data, such as geographic data, building data, images, UAV attributes, map data, etc. from the database 114b and transmit the same to the system 102 in a format suitable for use by the system 102. In some example embodiments, as disclosed in conjunction with the various embodiments disclosed herein, the system 102 may be used to process the data for determining a rooftop type of the rooftop 112 of the building 110 and safe landing spots for the UAV 104.

Continuing further, the database 114b may comprise suitable logic, circuitry, and interfaces that may be configured to store the attributes relating to the UAV 104 (referred to as a set of UAV attributes, hereinafter), attributes relating to the building 110 and the rooftop 112 (referred to as building data, hereinafter), geographic data (for example, comprising the first set of images relating to a geographic region in which the building 110 is located), map data, probe data, and other historical and/or real-time data. Such data may be collected from a database associated with the UAV, the UAV 104 itself, a database associated with the building 110, unmanned aerial vehicles travelling across the geographic region associated with the building 110, probe UAVs, historical data relating to UAVs that landed on the rooftop 112 of the building 110, and so forth. The data may be collected from any sensor that may transmit such data to the mapping platform 114 or the database 114*b*.

In some embodiments, the database 114*b* may further store historical data for safe (or successful) and unsafe (or unsuccessful) landings on the rooftop 112.

In operation, the system 102 may be configured to obtain location information associated with the UAV 104. In an example, the system 102 may obtain the location information from one or more sensor associated with the UAV 104. For example, the system 102 may obtain the location information from a GPS sensor of the UAV 104. In an example, the system 102 may also obtain a set of UAV attributes associated with the UAV. The set of UAV attributes may include, but are not limited to, size or dimensions of UAV 104, weight of the UAV 104, weight of the cargo 106 carried by the UAV 104, current battery charge status or remaining battery charge of the UAV 104, size, or dimensions of the cargo 106, or a combination thereof.

Thereafter, the system 102 may be configured to obtain the first set of images and the building data associated with the building 110 in proximity of the UAV 104, based on the location information. In particular, the system 102 may determine a geographic region corresponding to the UAV 104 based on the location information, i.e., a geographic region within which the UAV 104 is currently operating. Based on a mapping between the geographic region of the UAV 104 and geographic regions corresponding to different buildings, the system 102 may identify buildings in proximity to the UAV 104. Pursuant to present example, the system 102 may determine that the building 110 is within the geographic region of the UAV 104 or in proximity to the UAV 104. Once determined, the system 102 may obtain the first set of images and the building data associated with the building 110 having the rooftop 112. The first set of images may include images, for example, satellite images, terrain-view images, topographic images, and so forth, associated with the building 110 and the rooftop 112. Moreover, the building data may include attributes relating to the building 110 and the rooftop 112. In an example, the set of building related attributes may include, but are not limited to, geographic data associated with the building 110, building shape, building size, and building structure attributes, building construction attributes, building shadows, building identifiers or a combination thereof.

Thereafter, the system 102 may be configured to extract a set of rooftop features for the rooftop 112 of the building 110, using the first set of images and the building data. In an example, the set of rooftop features includes at least a rooftop type and a durability parameter for the rooftop 112. To this end, the system 102 may identify a construction material used for one or more parts of the rooftop 112 to determine the rooftop type for the rooftop 112. In an example, the system 102 may perform image processing techniques on the first set of images to identify one or more construction materials corresponding to one or more parts of the rooftop 112. For example, the image processing techniques may be used to identify the one or more construction materials corresponding to the one or more parts of the rooftop 112 based on color, shape, size, label, etc. In an example, the image processing of the first set of images may be performed based on information in the building data. In an example, the system 102 may distinguish different construction materials based on color, texture, shape and size. For example, on identifying a transparent green structure on the rooftop 112, the system 102 may identify a first part 112*a* of the rooftop 112. In such a case, the first part 112*a* may be made of a construction material, such as a plastic sheet, PVC sheet, etc. Moreover, on identifying a solid textured structure having a color similar to a wall of the building 110, red, grey or off-white color on the rooftop 112, the system 102 may identify a second part 112*b* of the rooftop 112. For example, the second part 112*b* is made of a construction material, such as cement, concrete, brick etc.

In an example, based on the first set of images and the building data, the system may identify the rooftop type. For example, the rooftop type may indicate one or more parts of the rooftop 112 that may be made or constructed using different construction materials. To this end, based on the identification of the one or more parts of the rooftop 112 and the identification of the one or more construction materials for the one or more parts, the system 102 may determine durability parameter of the rooftop 112. For example, different construction materials may have different durability parameters. Subsequently, based on the one or more construction materials of the one or more parts of the rooftop 112, the corresponding durability parameter may be determined.

To this end, based on the rooftop type of the one or more parts of the rooftop 112, i.e., construction material used for constructing each of the one or more parts, durability of the rooftop 112 may be identified. For example, the durability parameter may indicate an amount or weight of load that the one or more part of the rooftop 112 can easily handle. In an example, the first part 112*a* of the rooftop 112 may be made of, for example, a plastic or PVC sheet, and the first part 112*a* of the rooftop 112 may be made of, for example, cement, concrete or brick. Therefore, the first part 112*a* of the rooftop 112 may have a lower durability parameter as compared to a durability parameter of the second part 112*b* of the rooftop.

The system 102 may then store the set of rooftop features in conjunction with the building data for the building 110 in the map database 114*b*. In particular, the system 102 may update the map database 114*b* to indicate the rooftop type and the durability parameter of the rooftop 112. Based on the updated map database 114*b*, the system 102 enables navigation of the UAV 104 for landing of the UAV 104 on the rooftop 112.

In an example, based on the set of UAV attributes and the updated database 114*b*, the system 102 may determine a classification label for one or more landing spots on the rooftop 112 of the building 110 for facilitating the landing of the UAV 104 on the rooftop 112. Based on the classification label, the system 102 may identify one or more safe landing spots on the rooftop 112 of the building 110.

It may be noted that the rooftop 112 disclosed in the examples of the present disclosure has two parts, 112*a* and 112*b*, made of different construction materials. However, such illustration of the rooftop 112 should not be construed as a limitation. In other examples of the present disclosure, the rooftop 112 may have a single part made of a single construction material, or more than two parts made of same or different construction materials.

These and other embodiments of the present disclosure are explained in further detail in conjunction with following figures.

FIG. 2 illustrates a block diagram 200 of the system 102, exemplarily illustrated in FIG. 1 that may be used for determining rooftop type of the rooftop 112 of the building 110, in accordance with an example embodiment. FIG. 2 is explained in conjunction with FIG. 1.

The system 102 may include at least one processor 202, a memory 204, and an I/O interface 206. The at least one processor 202 may comprise modules, depicted as an input module 202a, a data module 202b, a model training module 202c, a prediction module 202d, an output module 202e and a routing module 202f.

In accordance with an embodiment, the system 102 may store data that may be generated by the modules while performing corresponding operation or may be retrieved from a database associated with the system 102, for example, the database 114b shown in FIG. 1. In an example, the data may include map data, probe data, geographic data, UAV attributes, location information, first set of images, building data, sensor data, training data, set of rooftop features, and navigation or routing instructions.

In an example embodiment, the data module 202b may determine a plurality of features that are to be used for training a machine learning model to determine a rooftop type of a rooftop. For example, the data module 202b may also identify classification labels, using training data for training. In an example, the plurality of features may include, but are not limited to, UAV-related features, rooftop-related features, building-related features, environment-related features, and tuples of aforementioned features. Such plurality of features may form functional class features of rooftops, buildings, and UAVs. In one embodiment, to determine which features are to be used, i.e., to determine the functional class features, the data module 202b may evaluate whether values for each candidate feature is sufficiently different (e.g., statistically significant, different beyond a threshold) for each corresponding rooftop type. In an example, the classification label may be one of safe landing zone label for safe landing spots, risky landing zone label for risky landing spots, and no landing zone label for non-durable landing spots.

Further, the data module 202b is configured to collect and/or analyze data from the database 114b, and/or any other data repositories available over the network 116 to obtain values for the plurality of features corresponding to the functional class features. For example, the data module 202b may query the database 114b for functional class values for the functional class features relating to rooftops and buildings of interest. In addition, the data module 202b may collect and/or analyze probe or trajectory data as stored in the database 114b and/or generated by one or more UAVs or UE on-board the UAVs. For example, the data module 202b is configured to probe traces from the probe data that originate from or terminate at rooftops of interest. The probe traces are then used to rooftop related features such as the historical landing on the rooftop, availability for landing, and landing spots service based on time of day and week related features, consent information, and so forth.

In one embodiment, the data module 202b is configured to assemble a set of training data based on the functional class features and corresponding functional class values. The training data, for instance, comprises building-related features, rooftop-related features and UAV-related features. Further, rooftop related features having assigned rooftop type and durability parameter are used as ground truth data for training. The data module 202b is then configured to retrieve or otherwise compute the values for the building-related features, rooftop-related features and UAV-related features and incorporates those values into the training data. In an example, the training data may also include values associated with environment—related features and road-related features. The training data may further include determined feature values relating to landings of UAVs on rooftops, attributes of UAVs, one or more landing spots, one or more safe landing spots, one or more unsafe landing spots, one or more rooftops, one or more buildings, one or more roads where corresponding buildings are located and environment as fields of the data record and functional class values corresponding to the fields or function class features of the data record. In one embodiment, the training data may be divided into a training set for actually training machine learning model(s), and a test/validation set for validating or determining an accuracy of the trained machine learning model.

In one embodiment, the model training module 202c is configured to use the training data (e.g., to initiate a training of a machine learning model to determine rooftop type of unlabeled test samples). In one embodiment, depending on a type of machine learning model that is used (e.g., Bayes Net, Decision Tree, etc.), the model training module 202c may initiate a tuning of hyper-parameters for the machine learning model before training of the model is performed. By way of example, a hyperparameter is a parameter of the machine learning model that affects how machine learning algorithm trains itself (e.g., parameters related to avoiding overfitting of data by the model). Generally, hyperparameters cannot be learned directly from the training data in the standard model training process and need to be predefined. Examples of hyperparameters are regularization parameters such as a "C" parameter that determines the margin of separation for a classification hyperplane. For example, the "C" or regularization parameter can be varied to avoid misclassifying each training sample. Other examples of hyperparameters include, but are not limited to, a training window duration, a number of leaves or depth of a tree, a learning rate, etc.

The model training module 202c is configured to initiate the training of the machine learning model by feeding a set of known rooftop types, for example, based on corresponding construction materials, functional class features and functional class values of the training data into the machine learning model to learn from the training data. Based on the learning, weights or confidence score of the machine learning model may be updated. In one embodiment, the model training module 202c may train a number of different machine learning models (e.g., Bayes Net, Decision Trees, Support Vector Machines, Neural Networks, etc.) with the training data. The model training module 202c may then evaluate accuracy or other performance characteristics (e.g., true positive rates, false positive rates, specificity, etc.) to select a model to use as the machine learning model for determining rooftop type of unlabeled test samples. In an example, the machine learning model may also be trained to perform image processing on a set of images associated with rooftops in the training data to identify different construction materials used in different rooftops. The machine learning model may also be trained to perform image processing to identify parts of a rooftop of a particular building that may be constructed with different construction materials.

Once trained on the training data, the machine learning model may extract functional class values (also referred to as, a set of rooftop features) corresponding to the fields of the data record for the unlabeled test samples. Based on the extracted functional class values, the machine learning model may determine rooftop type for rooftops in the unlabeled test samples. In an example, the machine learning model may be configured to extract function class values corresponding to functional class features in the test samples. The machine learning model may also be configured to identify parts of rooftops and predict a rooftop type of the parts of rooftops for unlabeled test rooftop samples in test samples. Based on the determined rooftop type of the rooftops in the test samples by the machine learning model and corresponding durability parameters of parts of rooftops, weights of the machine learning model may be further updated.

Thereafter, the trained machine learning model may extract functional class values for unlabeled rooftop, such as the rooftop 112. In accordance with an embodiment, the input module 202a may obtain data relating to the unlabeled rooftop 112. In particular, the input module 202a may retrieve first set of images and building data relating to the building 110 and/or the rooftop 112. For example, the input module 202a may access the database 114b and/or other databases associated with the system 102, the UAV 104 and the building 110, to obtain the first set of images and building data. The firsts set of images may include, for example, various types of images associated with the building 110, the rooftop 112, and geographic area or geographic region in which the building 110 is located. Further, the building data may include, for example, location information relating to the building 110, size, shape, shadow, outline, building construction information, identifier, and so forth. For example, the input module 202a may also retrieve data relating to environment attributes for real-time and/or historical environment in the geographic region where the building 110 is located, road data relating to real-time and/or historical road data (or street) associated with the building 110, UAV attributes relating to a UAV 104 that may have to find a landing spot to land, and so forth.

In one embodiment, the prediction module 202d may then use the trained machine learning model to extract a set of rooftop features for the rooftop 112 of the building 110, using the first set of images and the building data. For example, the set of rooftop features includes at least a rooftop type and a durability parameter for the rooftop 112.

In an example, the prediction module 202d may process the first set of images of the building 110 and the rooftop 112 in conjunction with the building data, using the trained machine learning model. For example, the building data may indicate a building location (for example, geographical coordinates), a building type (for example, commercial building, residential building, educational building, factory, hospital, shopping complex, bus terminal buildings, etc.), a building shape (for example, rectangular, L-shaped, T-shaped, pyramid, etc.), a building height, a building structural assessment (for example, beam thickness, shear wall, column, stress, etc.), construction material (for example, masonry materials (such as stone, brick, cement, etc.), natural construction materials (such as, glass, wood, stone, mud, clay, etc.), fabric (such as polyester, etc.), plastic, concrete, steel, metal, or a combinations thereof.), a building outline (for example, two-dimensional representation of rooftop 112 outline of the building 110), building feature type (for example, points, lines, polygons, based on geometry of the building 110), building rooftop type information (for example, extended rooftop, shaded rooftop, A-frame roof, gable roof, flat roof, shed roof, rooftop of roofing material, etc.), building shadows (for example, shadow casted by the building 110 during different times of the day), building courtyard information (for example, information relating to open-air area surrounded by building walls of the building 110, typically located in a building's center), building blueprint (for example, a two-dimensional drawings of visual representation of the building 110), and building identifier (for example, a unique building number, etc.). Moreover, the first set of images may represent aerial images of the building 110. Based on the first set of images and the building data, the set of rooftop features for the rooftop 112 of the building 110 may be determined. In an example, road data (such as, road or street on which the building 110 is located, type of construction of the road, traffic on the road, etc.) and environment attributes (such as, rainfall, wind data, etc.) may also be considered for determining the set of rooftop features of the rooftop 112.

In an embodiment, the set of rooftop features may include the rooftop type and the durability parameter for the rooftop 112. For example, the rooftop type may indicate a type of construction of the rooftop 112, such as rooftop shape, rooftop size, rooftop construction material, parts of rooftop constructed using different materials, extension or shade on the rooftop, etc. Based on the rooftop type, durability parameter for one or more parts of the rooftop 112 may be determined. In an example, the durability parameter may be determined based on construction material and shape of each part of the rooftop 112 and a set of durability features indicating durability parameters corresponding to different types of construction and different construction materials. For example, such set of durability features may be obtained from a database associated with the system 102, the building 110, a construction company associated with the building 110, or any other database accessible over the network 116. Based on the set of durability features, a durability parameter for each part of the rooftop 112 may be determined. For example, the durability parameter for a part of the rooftop 112 may indicate a weight tolerance of the corresponding part of the rooftop 112. In an example, the rooftop 112 may have only one part, i.e., no extensions or shade. In such a case, durability parameter for the single part of the rooftop 112 may be determined. In another example, the rooftop 112 may have a partially-covering shade over a part of the rooftop 112 (as shown in FIG. 1). In such a case, durability parameter for the different parts of the rooftop 112 may be determined. For example, the prediction module 202d may extract the set of rooftop features for the rooftop 112 using the trained machine learning model.

In an example, the prediction module 202d may use the trained ML model to determine the rooftop type and the durability parameter based on different color, shape, and size of one or more parts of the rooftop 112. Pursuant to present example, the prediction module 202d may extract functional class values associated with the rooftop 112. Based on the extracted functional class values, the prediction module 202d may identify that rooftop type of the rooftop 112 is a flat roof having the first part 112a and the second part 112b, wherein the first part 112a partially covers the second part 112b. The prediction module 202d may identify that the rooftop type of the rooftop 112 indicates that the first part 112a is made of a first construction material, such as a construction material having blue color, transparent, curve-shaped, etc. Similarly, the system 102 may identify that the rooftop type of the rooftop 112 indicates that the second part 112b is made of a second construction material, such as a construction material having white or grey color, textured, non-transparent, flat-shaped, etc. Based on the rooftop type, the prediction module 202d may then determine durability parameter for each of the first part 112a and the second part 112b of the rooftop 112. In an example, based on the set of rooftop features, the system 102 may determine that the first part 112a of the rooftop 112 may be a temporary structure, such as a polyvinyl chloride (PVC) sheet extension. Subsequently, the durability parameter of the first part 112a of the rooftop 112 may indicate that the first part 112a is less durable. The system 102 may determine that the second part may be a permanent structure, such as a cement or concrete rooftop of the building 110. Subsequently, the durability parameter of the second part 112*b* of the rooftop 112 may indicate that the second part 112*b* is durable. Based on a set of durability features associated with different construction materials, the durability parameter for the one or more parts of the rooftop 112 may be determined.

In an example, the one or more different parts of the rooftop 112 may have one or more landing spots. For example, the rooftop type and the durability parameter may be used to assign a classification label to the one or more landing spots. The classification label may indicate at least one of a safe landing zone, a risky landing zone or a no landing zone, based on a set of UAV attributes, and the set of rooftop features. Based on the classification label, the one or more safe landing spots, i.e., landing spots having safe landing zone classification label associated therewith may be identified.

In this regard, the prediction module 202*d* may assign classification label to the different landing spots, for example, by assessing availability of the landing spot, any item or object or obstruction on the different landing spots, total weight of the UAV 104, size of the UAV 104, size of the cargo 106 carried by the UAV 104, weight of the cargo 106 carried by the UAV 104, rooftop type associated with different landing spots on the rooftop, durability parameter (or weight tolerance) of the different landing spots, size of different landing spots, etc. Based on the classification labels for the different landing spots, the prediction module 202*d* may identify and determine one or more safe landing spots for landing the UAV 104 on the rooftop 112. For example, one or more landing spots with safe landing zone classification label may be identified as the one or more safe landing spots. The prediction module 202*d* may then store the assigned classification labels for the different landing spots on the rooftop 112 as landing data for the particular landing of the UAV 104 on the rooftop 112. For example, the data record corresponding to landing of the UAV 104 on the rooftop 112 in question may be updated to specify the assigned classification label.

It may be noted that if the rooftop 112 has a single part, in such case, the durability parameter of the entire rooftop 112 may be similar or same. Therefore, a classification label for each of the different landing spots on the rooftop 112 may be same if no other object or obstruction is present on the rooftop 112. However, if another object or obstruction, for example, water tank, chilling plant, water treatment plant, air conditioning plant, heating plant, and solar power plant, is present on the rooftop 112, the prediction module 202*d* may assess the object or obstruction to determine updated durability parameter for the rooftop 112 based on the object or obstruction. In this manner, the prediction module 202*d* may check whether the rooftop 112 may be capable of withstanding the weight of the UAV 104 and the cargo 106 along with the weight of the object or obstruction that may be present on the rooftop 112. Such embodiment of assessing the object or obstruction present on the rooftop is explained in further detail with FIG. 4.

In an example embodiment, the prediction module 202*d* may be triggered for autonomous or automatic determination of the building 110 in proximity to the UAV 104. For example, such autonomous determination may be determined based on current charge level of battery of the UAV 104 (such as, when charge in the battery is low), identification of a region or location where landing spot of interest may exist, and/or detection of the landing spot of interest, pause of operation of the UAV 104, unforeseeable bad weather conditions, fault, or failure in the UAV 104, etc. The building 110, specifically, the rooftop 112 of the building 110 may then be automatically assessed for extracting the set of rooftop features, identifying landing spots and labeling the landing spots with classification labels according to the various embodiments described herein.

In one embodiment, the output module 202*e* may then generate instructions to store the set of rooftop features comprising the rooftop type and the durability parameter within the map database 114*b*. In an example, the output module 202*e* may update data corresponding to the building 110 and/or the rooftop 112 in the map database 114 to indicate the rooftop type and the durability parameter for the rooftop 112. In addition, the output module 202*e* may also generate instructions to store the classification label corresponding to one or more landing spots on the rooftop 112. The determined data, such as rooftop type, durability parameter and classification label, associated with the rooftop 112 may be stored in conjunction with other data, such as the first set of images and the building data, relating to the building 110 and the rooftop 112. Moreover, based on the classification label, one or more safe landing spots on the rooftop 112 may be identified. For example, the safe landing spots may be on same or different parts of the rooftop 112. Moreover, a same part of the rooftop 112 may have one or more safe landing spots.

In an example, the output module 202*e* may generate instructions to direct the UAV 104 to the identified one or more safe landing spots for safe landing of the UAV 104. In an example, the prediction module 202*d* may determine that landing of the UAV 104 on certain of the different landing spots may result in safe landing. For example, the output module 202*e* may determine a landing spot on the second part 112*b* of the rooftop 112 from the different landing spots on the rooftop 112 for safe landing. The determined landing spot may have safe landing zone classification label for landing. In an example, the determined landing spot for landing may be the safe landing spot that is nearest to an original route or the current location of the UAV 104. Subsequently, the output module 202*e* may generate navigation instructions or trigger a navigation system on-board the UAV 104 to navigate the UAV 104 to the determined safe landing spot on the rooftop 112 for landing.

In an example, the output module 202*e* may generate a landing output associated with the landing of UAV 104 on the rooftop 112, based on the classification label. For example, the classification label may indicate which landing spot(s) on the rooftop 112 may have safe landing zone label associated thereto. Further, the output module 202*e* may provide the landing output to the UAV 104 and/or a user associated with the UAV 104. For example, the landing output and the classification label for each of the one or more safe landing spots on the rooftop 112 may be provided to the user and/or the UAV 104, via a user interface. The user interface may also provide options for the user to review and/or approve the automatically generated classification label and landing output.

In an example embodiment, the output module 202*e* may present information relating to position of the UAV 104 and where the UAV 104 may land on the determined safe landing spot(s) on the rooftop 112 as part of the landing output. In an example embodiment, the landing output may include an exact location of the determined safe landing spot on the rooftop 112 and a position (such as, angle, yaw, throttle, etc.) of the UAV 104 for landing the UAV 104 on the determined safe landing spot. Thereafter, based on the landing output, the UAV 104 may land on the safe landing spot on the rooftop 112. In one embodiment, the output module 202*e* may provide the generated classification label, navigation instructions and the landing output to support the UAV 104 in finding the rooftop 112 of interest and facilitate landing of the UAV 104 on the rooftop 112. For example, the output module 202e may initiate a presentation of an end user interface at the UAV 104 and/or UE, wherein the end user interface depicts representations (e.g., visual representation, audio representation, etc.) of the rooftop 112 for landing of the UAV 104. It is further noted that the output module 202e may operate over the communication network 116 to facilitate the exchange of classification label, navigation instructions and landing output.

In certain cases, landing spots on the rooftop may have risky landing zone classification label and/or no landing zone classification label. Such unsafe landing spots having risky landing zone label and/or no landing zone label may also be indicated in the landing output to caution or warn the UAV 104 or user associated with the UAV 104 from landing on such unsafe landing spots. For example, landing spot(s) on the first part 112a of the rooftop 112 may be classified with risky landing zone label or no landing zone label, owing to less durability (or low durability parameter value compared to a predefined threshold) of material used for construction of the first part 112 and heavy weight of the UAV 104. In such a case, the landing spot(s) on the first part 112a of the rooftop 112 may be included as a part of the landing data to warn the UAV 104 and/or user or controller of the UAV 104 from landing on unsafe landing spot(s) on the first part 112a. In one example, safe landing spots on the rooftop 112, i.e., landing spots having safe landing zone classification label, may be marked in green to indicate navigation to such safe landing spots. Alternatively, unsafe landing spots on the rooftop 112, i.e., landing spots having risky landing zone classification label and/or no landing zone classification label, may be marked in red to warn a user about not navigating to such unsafe landing spots.

In an example, the system 102 may enable the UAV 104 or a processor associated with the UAV 104 to determine a classification label for landing spots on the rooftop 112 locally. In such a case, the UAV 104 may retrieve the set of rooftop features associated with the rooftop 112 of the building 110, when the UAV 104 is in proximity to the building 110 and is looking to land. The UAV 104 may then determine the classification label for different landing spots on the rooftop 112, based on the set of UAV attributes and the set of rooftop features. In particular, based on the rooftop type, the durability parameter, and the set of UAV attributes, the UAV 104 may assign one of: a safe landing classification label, an unsafe landing classification label, or a no landing classification label to the landing spots on the rooftop. Subsequently, the UAV 104 may identify which landing spot on the rooftop 112 is favorable for landing of the UAV 104. The UAV 104 may then generate instructions to navigate to the safe landing spot.

The above presented modules and components of the system 102 can be implemented in hardware, firmware, software, or a combination thereof. Though depicted as a separate entity in FIG. 1, it is contemplated that the system 102 may be implemented as a module of any of the components of the mapping platform 112. In another embodiment, one or more of the modules 202a-202f may be implemented as a cloud based service, local service, native application, or combination thereof.

In accordance with an embodiment, the output module 202e may also store the determined landing output corresponding to the landing of the UAV 104 on the rooftop 112 along with corresponding processed information. In an example, the processed information and the landing output may then be fed to the routing module 202f. The routing module 202f may be configured to generate user readable or user-understandable navigation instructions, such as routing messages, notifications, etc., based on the landing output. The routing module 202f may send or push the routing messages to user equipment, such as the user equipment on-board the UAV 104, to enable routing of the UAV 104 towards the a safe landing spot on the rooftop 112, such as a landing spot on the second part 112b of the rooftop 112.

Although the present embodiment describes determining rooftop type of different parts of the rooftop 112 of the building 110 and identifying safe or unsafe landing spots on the rooftop 112. However, this should not be construed as a limitation. In other examples of the present disclosure, rooftops of plurality of buildings may be assessed to determine safe and unsafe landing spots on different rooftops of different buildings. Moreover, a rooftop, such as the rooftop 112, may have different landing spots on same or different parts made of same or different construction materials.

In one embodiment, the prediction module 202d may assign classification labels to the different landing spots on the rooftops of a plurality of buildings. For example, a user associated with the UAV 104 may provide a list of buildings or rooftops where the UAV 104 may land in corresponding geographical region, wherein different landing spots on different rooftops of different buildings within a geographical region are to be labeled by the prediction module 202d. In another example, the prediction module 202d may identify the plurality of buildings and corresponding rooftops in proximity of the UAV 104, based on the location information associated with the UAV 104. In such a case, the prediction module 202d may extract a set of rooftop features for the different rooftops and determine classification label for the different landing spots on different rooftops associated with the plurality of buildings. The UAV 104 may land on any one of one or more safe landing spots on one or more rooftops of one or more buildings from the plurality of building in proximity to the UAV 104.

The prediction module 202d may then determine safe landing spots for landing the UAV 104 on the rooftop 112. In particular, the prediction module 202d may determine the one or more safe landing spots for the UAV 104 may be on the second part 112b of the rooftop 112. For example, the one or more safe landing spots may have a durability parameter higher than a predefined threshold and/or a durability parameter higher than a durability parameter of other landing spots on the rooftop 112. For example, a durability parameter of a landing spot made of concrete may be 8 and the pre-defined threshold may be 5. In another example, a durability parameter of a landing spot on the first part 112b of the rooftop 112 made of polymer may be 6 and a durability parameter of a landing spot on the second part 112b of the rooftop 112 made of concrete may be 8.

In an example embodiment, the prediction module 202d may be configured to identify or detect the building 110 within a region of interest or region corresponding to the current location of the UAV 104. In an example, the region of interest may correspond to a region nearby or below (i.e., on ground level) a route on which the UAV 104 is travelling. Subsequently, buildings within the region of interest may involve substantially less re-routing of the UAV 104 to ensure minimum cost associated with the re-routing and landing. In an example, the system 102 may detect the building 110 within the region of interest by processing one or more images, such as the first set of images, captured by the UAV 104 of the corresponding route, stock images of the route, or by querying database 114b for images and geographic data corresponding to the region of interest.

Continuing further, the processor 202 may retrieve computer executable instructions that may be stored in the memory 204 for execution of the computer executable instructions. The memory 204 may store the training data, and/or obtained functional class values of set of rooftop features associated with the building 110 and the rooftop 112. In accordance with an embodiment, the processor 202 may be configured to retrieve input (such as, real-time sensor data, historical probe data, real-time probe data, map data indicating map attributes associated with route of UAV 104, geographic data indicating geographic coordinates associated with the UAV 104 and the building 112, building data, images, and historical landing data) from background batch data services, streaming data services or third party service providers, and renders output, such as, the landing output, the classification label, navigation instructions, and notification associated with the landing for use by the end user through the I/O interface 206.

The processor 202 of the system 102 may be configured to identify a plurality of buildings, such as the building 110 in proximity of the UAV 104, based on the location information associated with the UAV 104. The processor 202 may be further configured to extract a set of rooftop features for the rooftop 112 of the building 110, using the first set of images and the building data. In an example, the processor 202 may use a machine learning model to extract the set of rooftop features, for example, based on image processing. For example, the set of rooftop features comprise a rooftop type and a durability parameter for the rooftop 112. Based on the extracted set of rooftop features, the processor 202 may be configured to update the map database 114b to store the set of rooftop features in conjunction with data records relating to the building 110 and/or the rooftop 112. In an example, the processor 202 may also determine different landing spots on the rooftop 112 and assign a classification label to each of the different landing spots on the rooftop 112, based on the set of rooftop features and a set of UAV attributes. Based on the classification label, the processor 202 may determine safe landing spot(s) from the different landing spots that may have safe landing zone classification label, i.e., that may be safe for landing the UAV 104. The processor 202 may determine landing output for landing of the UAV 104 on the rooftop 112.

The memory 204 of the system 102 may be configured to store a dataset (such as, but not limited to, the training data, the first set of image, the building data, the set of rooftop feature, the set of UAV attributes, location information, the functional class values associated with landing, landing output, classification label, the geographic data, the probe data, and the map data) associated with rooftops, and buildings. In accordance with an embodiment, the memory 204 may include processing instructions for processing the data. The dataset may include real-time data and historical data, from service providers.

FIG. 3 illustrates a flowchart for implementation of an exemplar method 300 for training a machine learning model for determining rooftop type of the rooftop 112, in accordance with an example embodiment. Although the method 300 is illustrated and described as a sequence of steps, its contemplated that various embodiments of the method 300 may be performed in any order or combination and need not include all of the illustrated steps.

At 302, training data relating to one or more rooftops is received. In an example, the training data is labeled data. In such a case, the training data may include a set of rooftop attributes relating to one or more parts of the one or more rooftops, a set of building data relating to buildings corresponding to the one or more rooftops and a set of labels relating to classification of the one or more parts of the one or more rooftops. In an example, the set of labels may include safe landing zone classification label, risky landing zone classification label and no landing zone classification label.

For example, the labeled training data is historical and consists of tuples of the features associated with rooftops, such as rooftop attributes, building attributes, road attributes where buildings are located, and environment attributes in a geographical region where the buildings are located. The labeled training data also include a set of labels indicating ground truth labels which denotes a type of a construction materials based on attributes or features rooftops, such as color, shape, size, texture, construction information, etc.

In accordance with an embodiment, the labeled data may also include data relating to landing of UAVs on rooftops, such as UAV attributes while landing, consent for landing, type (successful or unsuccessful) of landing, and the like. In an example, the labeled training data may include data pertaining to several historic landing samples of one or more UAVs on one or more rooftops. In an example, the labeled data may also include an extent of damage, such as type of damage (for example, chipping, crack, collapse, etc.), size and depth of damage, cost incurred for repair, time taken to repair, and other data relating to damage, in case of an unsafe landing of a UAV on a rooftop wherein the unsafe landing may have caused damage to the rooftop. In accordance with an example, the training data may be generated by the data module 202b by identifying functional class features associated with rooftop attributes, and collating functional class values pertaining to the historic landing samples.

At 304, a plurality of features corresponding to the one or more parts of the one or more rooftops is determined, using the training data. In an example, the data module 202b may determine the plurality of features, based on the functional class values that may be selected to train the machine learning model.

In one embodiment, the plurality of features used to train the machine learning (ML) model for determining rooftop type includes, but is not limited to, functional class features of rooftops, the buildings, the road, and environment. In an example, functional class features relating to rooftops may include, but are not limited to, rooftop type, one or more parts of rooftop, construction material of the one or more parts, color of the one or more parts of the rooftop, durability parameter, consent for landing, one or more object present, shape of rooftop, size of rooftop, and structure of rooftop. In an example, functional class features relating to buildings may include, but are not limited to, building shape, building outline, building shadow, building location, building feature type, building blueprint, building identifier, building courtyard information, building construction material, and information relating to any other open area in the building (such as, balcony, parking space, etc.).

In certain cases, the training data may include information relating to historical landings of UAVs on rooftops. In such a case, the plurality of features used to train the machine learning (ML) model may also include functional class features relating to historical UAV landings, such as UAV attributes of UAVs, and success or failure in landing. Examples of functional class features relating to UAVs may include, but are not limited to, principal routes (e.g., flight paths for primary operations or original route, such as route of delivery operations, etc.), size and weight of UAVs, cargo information associated with UAVs, and battery properties (e.g., age of battery, type of battery, capacity of battery, etc.) of UAVs. Further, the functional class features may also relate to environment at a time of landing in the historic labeled landing sample such as, but are not limited to, visibility, wind speed, rain, air traffic density, etc. Examples of functional class features relating to road or geographic region where the rooftops are located may include, but are not limited to, road construction material, soil information, disaster-related information, geographic location, and so forth.

In an example, a number to the functional class features may be assigned in accordance with decreasing importance of the corresponding functional class features in determining rooftop type for rooftop. It may be noted that values corresponding to the functional class features may form the function class values to be used for training. In one embodiment, each functional class feature is identified according to a number (e.g., 1=color of a part of a rooftop, 2=construction material of the part of the rooftop, 3=durability parameter of the part of the rooftop, 4=object attributes associated with one or more objects placed on the part of the rooftop, and 5=principal or original route of UAV). To this end, the functional class features are selected features that are identified for training and the training model is then trained based on the functional class features and values of the functional class features. For example, a machine learning model may determine a relationship between functional class features and functional class values to apply, after training on ground truth data. For example, set of labels associated with the labeled landing samples in the training data may include the ground truth labels (or the ground truth data) indicating at a rooftop type or construction material identified for one or more parts of rooftops. Based on the relationship, the ML model may learn relationship between functional class features and corresponding functional values for identifying different rooftop types.

In an example, the training data may include training images relating to one or more rooftops and corresponding one or more buildings. To this end, the machine learning model may learn to perform image processing techniques to identify functional class values from the training images. For example, the functional class values may relate to building features, rooftop features, damage features in case of unsafe landing, object features, or other features required for performing operations of the system 102. For example, based on the image processing of training images and other data records in the training data, the machine learning model may learn to extract a set of rooftop features for a rooftop based on images and building data relating to the rooftop, identify one or more parts of rooftop, identify one or more type of construction material for the one or more parts of the rooftop, identify landing spots on the rooftop, determine durability parameter, determine object attributes, predict weight tolerance of the one or more parts of the rooftop, assign classification label to landing spots, predict damage, and/or generate landing output.

In an example, the model training module 202c of the system 102 may be configured to train the machine learning model based on the training data generated by the data module 202b. In an example, the training data may be labeled. Subsequently, the training data may include labeled historic landing samples, set of labels, functional class features and functional class values. In an example, the machine learning model may be trained to identify relationships between functional class features and functional class values for different rooftop types.

At 306, the machine learning model is trained to determine rooftop type for one or more unlabeled test sample, using the functional class features and the training data. In an example, the machine learning model may be configured to predict weight tolerance of a rooftop from unlabeled test sample based on, for example, rooftop type and durability parameter. For example, the rooftop type may be determined based on color, size, shape, structure, etc. of the rooftop, one or more objects placed on the rooftop, building data, and environment factor. In this manner, the machine learning model may predict rooftop type for the one or more parts of the rooftop. The rooftop type may indicate a construction material used for construction of a part of the rooftop or the entire rooftop. Based on the rooftop type, the machine learning model may predict durability parameter or an amount of weight that one or more parts of the rooftop may be able to withstand.

In an example, the machine learning model may retrieve a set of UAV attributes relating to a UAV that may have historically landed on the rooftop. For example, the set of UAV attributes may include weight, shape and size of UAV 104; weight, shape and size of the cargo 106 carried by the UAV 104; location of the UAV 104; distance between the UAV 104 and the rooftop 112; principal route; battery information relating to the UAV 104, etc. Based on the set of UAV attributes and the determination of the rooftop type and durability parameter, the machine learning model may assign a classification label to landing spots on the one or more parts of the rooftop. Based on the classification label assigned and input of a user associated with the machine learning model, weight of the machine learning model may be updated. In certain cases, the machine learning model may also be trained to predict a level and/or an amount of damage for an unsafe landing of a UAV on a rooftop in the unlabeled test sample.

In an example, the identification of relationship and patterns may be done based on similar rooftop types, the functional class features, and the functional class values. Based on the relationship, the machine learning model may learn to predict rooftop type for rooftops in unlabeled test samples. The unlabeled test samples may include features relating to unlabeled rooftops. Once trained on the labeled training information, the machine learning model may be configured to determine the rooftop type for the unlabeled landing spots on the unlabeled rooftops. To this end, the machine learning model may be a neural network machine learning model, for example, artificial neural network (ANN), support vector model (SVM), convolution neural network (CNN), and so forth. For example, the trained machine learning model along with corresponding training data, i.e., the labeled historic samples and unlabeled test samples, may be stored locally on the UAV 104, or may be stored remotely (for example, on a cloud or other remote platform).

Although the embodiments of the present example describe the training of the machine learning model in a supervised manner, using labeled training data. However, such supervised training of the machine learning model should not be construed as a limitation. In other embodiments of the present disclosure, the machine learning model may be trained based on unsupervised learning using unlabeled training data, semi-supervised training using labeled and unlabeled training data, reinforcement training, and/or other training techniques present at a time of filing of the application or later. In an example, different types of machine learning models may be trained using same or different training techniques. Thereafter, a trained machine learning model having highest accuracy may be selected as the trained machine learning model for performing operations of the system 102.

FIG. 4A illustrates a flowchart for implementation of an exemplar method 400a for determining rooftop type of the rooftop 112, in accordance with an example embodiment. In various embodiments, the mapping platform 114 or the system 102 may perform one or more portions of the method 400a and may be implemented in, for instance, a chip set including a processor and a memory. As such, the mapping platform 114 or the system 102 may provide means for accomplishing various parts of the method 400a, as well as means for accomplishing embodiments of other processes described herein in conjunction with other components of the system 102. Although the method 400a is illustrated and described as a sequence of steps, its contemplated that various embodiments of the method 400a may be performed in any order or combination and need not include all of the illustrated steps.

At 402, location information associated with the UAV 104 is obtained. The location information associated with the UAV 104 may indicate a current location of the UAV 104. For example, the current location may be within a geographic region.

At 404, a plurality of buildings in proximity to the current location of the UAV 104 may be identified. In this regard, based on the location information of the UAV 104, the geographic region corresponding to the UAV 104 may be identified. Subsequently, a plurality of buildings, such as the building 110, within the geographic region corresponding to the UAV 104 may be identified.

At 406, a building, such as the building 110, from the plurality of buildings in proximity to the current location of the UAV 104 is selected for processing. In an example, the building 110 may be closest to the UAV 104 from other buildings in proximity to the current location of the UAV 104. In another example, the building 104 may be selected arbitrarily.

At 408, consent information pertaining to landing of the UAV 104 on the building 110 is obtained. In an example, the consent information may be obtained by querying the database 114b, or any other database associated with the plurality of buildings, including the building 110. For example, the consent information may indicate if the landing of the UAV 104 on the building 110 is permitted or not. In an example, one or more landing spots for facilitating landing of the UAV on the rooftop 112 of the building 110 is determined based on the consent information. In an example, such consent information may be based on consent from a user, such as an owner, a builder, etc., associated with the building 110.

At 410, a determination is made whether the UAV 110 is allowed to land on the building 110 or not. If the UAV 104 is allowed to land on the building 110, based on the consent information, the method 400a then proceeds to 412. However, if the consent information indicates that the UAV 104 is not allowed to land on the building 110, then the system may generate a request message to seek consent for landing. For example, such request may be sent to an authority, such as building authority associated with the building 110, an aerial navigation authority, etc. If the request is approved in time, for example, within a predefined time period, the method 400a then proceeds to 412. Alternatively, the method 400a may go back to step 406 to select another building from plurality of buildings in proximity to the current location of the UAV 104 for processing. It may be noted that when all of the buildings from the plurality of buildings in proximity to the current location of the UAV 104 may be processed to determine landing spots, the method 400a may end. In a case where none of the plurality of buildings in the geographic region has consented for landing of the UAV 104 on corresponding rooftops, the system 102 may stop searching for landing spots in the current geographic region. Thereafter, the system 102 may be re-triggered in another geographic region or stop looking for landing spots.

At 412, a first set of images and building data associated with the building 110 in proximity of the UAV 104 may be obtained. Based on the identified building 110 within the geographic region, first set of images and building data for the building 110 may be retrieved. For example, such data may be retrieved by querying the database 114b, other database associated with the system 102, the UAV 104, and/or third-party servers associated with the plurality of buildings, the geographic region, the road, etc. For example, the third-party servers may be associated with a municipality relating to the geographic region, construction companies associated with the plurality of buildings, map developers, planning and development organization associated with the plurality of buildings, and so forth. In an example, the first set of images may include satellite images relating to the geographic region, the building 110 or the rooftop 112; terrain-view images relating to the geographic region, the building 110 or the rooftop 112, or images captured by the UAV 104. For example, the UAV 104 may capture the first set of images during its operation, for example, when flying above the building 112 or near the building 112.

In accordance with the foregoing embodiments, processing of the first set of images and building data of a single building 110 is described, for sake of brevity. A manner in which the processing of data associated with the building 110 is performed may be repeated for other buildings from the plurality of buildings in the geographic region or proximity to the UAV 104. In certain other cases, first set of images ad building data relating to plurality of buildings in proximity to the current location of the UAV 104 may be processed in parallel.

At 414, a set of rooftop features for the rooftop 112 of the building 110 may be extracted. In this regard, the set of rooftop features may be extracted based on the first set of images and the building data. In an example, the set of rooftop features includes at least a rooftop type and a durability parameter for the rooftop. In one example, the processor 202 of the system 102 may determine the set of rooftop features for the rooftop 112, using a trained machine learning model. The machine learning model may fuse the first set of images and the building data of the building 110 with training of the trained machine learning model to determine the set of rooftop features. In an example, the machine learning model may determine the rooftop type of one or more parts of the rooftop 112. The rooftop type may indicate construction material used in the one or more parts of the rooftop 112, a shape of the one or more parts of the rooftop 112, and area of each of the one or more parts of the rooftop. It may be noted that the one or more parts of the rooftop 112 may be adjoining to each other or may be different from each other, and may be differentiated based on, for example, color, transparency, texture, height, area, etc. In certain cases, one or more parts of rooftop of a building may also include auxiliary rooftops of covered areas, such as rooftop or shed over a parking area, a balcony, a courtyard, a primary rooftop, etc.

Further, the machine learning model may determine the durability parameter of one or more parts of the rooftop 112, based on the rooftop type. The durability parameter of the rooftop 112 may indicate weight tolerance corresponding to the one or more parts of the rooftop 112, based on construction materials used for construction of such one or more parts of the rooftop 112. For example, the durability parameters corresponding to the different parts of the rooftop 112 may be determined based on a set of durability features corresponding to different construction materials, and construction material and shape used for the one or more parts of the rooftop 112.

At 416, one or more landing spots may be identified on the rooftop 112. In an example, there may be different landing spots on the rooftop 112, such as on different parts of the rooftop 112. It may be noted that in certain cases, certain non-landing area on a rooftop may be identified or marked, for example, based on building data and/or consent information. In such a case, no landing spot is identified in the non-landing area. Further, in case of no information regarding a rooftop, different landing spots may be identified on same or different parts of the rooftop 112.

At 418, one or more objects present on the rooftop 112 of the building 110 are identified, using the first set of images. In an example, the processor 202 may perform image processing techniques to identify objects, such as items, boxes, articles, etc., that may be placed on the rooftop 112. Examples of such objects may include, but are not limited to, water tanks, clothes lines, terrace garden or plants and trees, solar power plants, water chillers, air conditioning units, water heating plant, water treatment plants, or a combination thereof.

At 420, a set of object attributes associated with the one or more objects are determined. In an example, the set of object attributes may be determined based on the building data, the first set of images and the trained machine learning model. For example, the trained machine learning model may determine the set of object attributes to identify the one or more objects. The set of object attributes may include, such as type of object, size, shape, color, composition, etc. In another example, the set of object attributes may be provided in the building data. Subsequently, based on the set of object attributes and using the trained machine learning model, the processor may approximate a weight of the one or more objects. In an example, the system 102 may identify the set of object attributes corresponding to an object, wherein the set of object attributes may indicate that the object is a rooftop solar panel of a given dimension. Subsequently, based on data associated with solar panels, the system 102 may approximate a weight of the rooftop solar panel on the rooftop 112.

At 422, updated durability parameter for the one or more parts of the rooftop 112 of the building 110 is determined, based on the set of object attributes. It may be noted that the updated durability parameter may be determined for the part of the rooftop where the one or more objects are positioned. To this end, based on approximate weight of the one or more object, the system 102 may determine an amount of stress (or weight tolerance) that the corresponding part of the rooftop 112 can handle or withstand along with the stress imposed due to the one or more objects. For example, if a heavy object is placed on a plastic shed part of a rooftop (such as the first part 112a of the rooftop 112), an updated durability parameter of the plastic shed part of the rooftop may decrease substantially. As a result, such plastic shed part of the rooftop may be risky or unsafe for landing.

At 424, the map database 114b is updated to store the rooftop type and the updated durability parameter for the rooftop 112. In an example, the system 102 may store the rooftop type and the updated durability parameter for the rooftop 112 in conjunction with data records relating to the rooftop 112 and/or the building 110.

FIG. 4B illustrates a flowchart for implementation of an exemplar method 400b for determining rooftop type of the rooftop 112 for landing the UAV 104, in accordance with an example embodiment. In an example, the system 102 may perform the steps of the method 400b to facilitate landing of the UAV 104 on the rooftop 112, by determining the rooftop type and durability parameter for the rooftop 112. In another example, the steps of the method 400b may be performed at the UAV 104 locally. For example, the steps of the method 400b may be performed after the steps of the method 400a, i.e., based on the updated data records relating to the rooftop 112 in the updated map database 114b.

At 426, a set of UAV attributes are obtained. In an example, a set of UAV attributes relating to the UAV 104 may be obtained from the UAV 104 or a database associated with the UAV 104 and/or the system 102. For example, the set of UAV attributes may include, but are not limited to, size and dimensions of the UAV 104, weight of the UAV 104, size, and dimensions of the cargo 106 being carried by the UAV 104, weight of the cargo 106, original route of the UAV 104, battery or charge status of the UAV 104, and incident information (such as, fault, break from operation, bad flying weather, etc.) associated with the UAV 104.

At 428, a classification label is determined for each of the different landing spots on the rooftop 112. Based on the set of rooftop features and the set of UAV attributes, the processor 202 of the system 102 may assign a classification label to different landing spots on the one or more parts (such as the first part 112a and the second part 112b) of the rooftop 112. In an example, the classification label may include one of: a safe landing zone classification label, a risky landing zone classification label, and a no landing zone classification label. To this end, the system 102 may assess if a part of the rooftop 112 is able to withstand a weight of the UAV 104, based on the rooftop type, the durability parameter, the updated durability parameter and the set of UAV attributes. In an example, the system 102 may determine whether the part of the rooftop under consideration is made of a durable material and will the part be able to withstand the weight of the UAV 104. For example, the assessment may also be based on environment condition of the geographic region and other building data that may indicate a level of stability, robustness, and durability of the rooftop 112 and/or the building 110. Based on the assessment of different parts of the rooftop 112 having different durability parameters, the system 102 may assign classification labels to the different landing spots on the different parts of the rooftop 112.

At 430, one or more safe landing spots on the rooftop 112 of the building 110 are identified based on the classification label. In an example, one or more landing spots having safe landing zone classification label associated therewith may be identified as the one or more safe landing spots.

It may be noted that in certain cases, none of the landing spots on the rooftop 112 may be safe landing spots, i.e., have safe landing zone classification label assigned to it. In such a case, the method 400b may go back to step 406 of the method 400a to select another building from the plurality of buildings for determining safe landing spots. If one or more safe landing spots are identified on the rooftop 112, the method 400b may proceed to 432.

At 432, a landing output associated with the landing of UAV 104 on the rooftop 112, is generated, based on the classification label. For example, the classification label may indicate which landing spot(s) on the rooftop 112 may have safe landing zone label associated thereto. Further, the landing output may be generated to include the one or more safe landing spots on the rooftop 112, a selected safe landing spot (i.e., where to land) from the one or more safe landing spots for landing the UAV 104, a position (for example, angle, yaw, throttle, speed, etc.) for landing on the selected landing spot, and so forth. Thereafter, based on the landing output, the UAV 104 may land on the selected safe landing spot on the rooftop 112. In one embodiment, the output module 202e may provide the generated classification labels for different landing spots on the rooftop as part of the landing output. In such a case, unsafe landing spots from the different landing spots on the rooftop 112 having risky landing zone classification label and/or no landing zone classification label may be marked in the landing output to caution or warn the UAV 104 or user associated with the UAV 104 from landing on such unsafe landing spots.

In an example, the landing output may include a selected safe landing spot for landing the UAV 104 on the rooftop 112. In this regard, a safe landing spot may be selected from the one or more safe landing spots on the rooftop 112 that may be closest from a current location or route of the UAV 104. Thereafter, the processor 202 may generate navigation instructions to facilitate landing of the UAV 104 to land on the nearest safe landing spot. In an example, the navigation instructions may also be provided as part of the landing output.

In an example, the landing output may be presented in form of a map to the UAV 104 and/or the user associated with the UAV 104. In such a case, the one or more safe landing spots may be marked with a first color, for example, green, on a first layer of the map. Moreover, the one or more unsafe or risky landing spots may be marked with a second color, for example, red, on a second layer of the map. Subsequently, the UAV 104 and/or the user associated with the UAV 104 may select a safe landing spot for landing, from the first layer of the map, and avoid unsafe landing spots on the second layer of the map. In accordance with an example, the landing output may also include navigation instructions to support the UAV 104 in finding the rooftop 112 of interest and the one or more safe landing spots and/or the selected safe landing spot on the rooftop 112.

Although the determining of safe landing spots on the plurality of buildings for facilitating landing of the UAV 104 is illustrated as a sequential operation, however, steps of the methods 400a and 400b may be performed in parallel for the plurality of buildings. As a result, safe landing spots on one or more of the plurality of buildings may be determined in real-time or near real-time. In such a case, a safe landing spot on a building that is nearest to the current location of the UAV 104 may be selected for landing of the UAV. Accordingly, the UAV 104 may be directed for landing on the determined safe landing spot.

Referring now to FIG. 5 a flowchart for implementation of an exemplar method 500 for extracting a set of rooftop features for the rooftop 112 is illustrated, in accordance with an example embodiment. Although the method 500 is illustrated and described as a sequence of steps, it is contemplated that various embodiments of the method 500 may be performed in any order or combination and need not include all of the illustrated steps.

At 502, a rooftop type of the rooftop 112 of the building 110 is determined. In this regard, the rooftop type of the rooftop 112 may be determined based on the building data and the first set of images associated with the building 110 and using a trained machine learning model. In an example, the trained machine learning model may perform techniques of image and data processing to identify rooftop type of the rooftop 112. In an example, the trained machine learning model may process the building data and the first set of images to identify different color, texture, height, etc. on the rooftop 112. Based on the identification, the trained machine learning model may identify one or more parts of the rooftop 112. For example, based on different color, texture, height, etc., different construction materials may be determined for corresponding one or more parts of the rooftop 112. To this end, the rooftop type for the rooftop 112 may indicate one or more construction material used for construction of one or more parts of the rooftop 112.

At 504, a set of durability features corresponding to different construction materials are obtained. In an embodiment, the set of durability features may indicate durability corresponding to different construction materials. In an example, the set of durability features may include durability factors for different construction materials when used independently and/or in combination with other construction materials. For example, for concrete, durability factor may be defined based on attributes, for example, grade, chloride ion permeability, absorption, thaw and freezing, and porosity. In this manner, durability factor for different construction material may be defined based on different or same attributes. In an example, the durability factor may be defined in terms of an amount to stress that a structure made of a particular composition of a construction material will be able to withstand under a given geographic and environmental attributes.

For example, the set of durability features may be obtained from a database associated with the system 102, the building 110, or a third-party server. For example, the third-party server may be associated with a construction company associated with the building 110, a construction and/or civil engineering-related authority, a research facility associated with construction and/or civil engineering, or any other database relating to materials and civil work.

At 506, a durability parameter for the one or more parts of the rooftop 112 of the building 110 is determined, based on the rooftop type of the rooftop 112 and the set of durability features. In an example, the durability parameter may be determined based on the trained machine learning model. It may be noted, the rooftop type may indicate one or more parts of the rooftop 112, specifically, one or more construction material used in the one or more parts of the rooftop 112. Further, the rooftop type also indicate shape, size, and structure of the one or more parts of the rooftop 112, parts of rooftop constructed using different materials, extension or shade on rooftop, connection between the one or more parts of the rooftop 112, etc. Based on the rooftop type and the set of durability features, durability parameter for one or more parts of the rooftop 112 may be determined based on different construction materials used for the one or more parts. In an example, the rooftop 112 may have only one part, i.e., no extensions or shade. In such a case, durability parameter for the single part of the rooftop 112 may be determined. In another example, the rooftop 112 may have a partially-covering shade over a part of the rooftop 112 (as shown in FIG. 1). In such a case, durability parameter for the different parts of the rooftop 112 may be determined.

In an example, the durability parameter may be determined based on, for example, construction material, age, current stress, and so forth, of each of the one or more parts of the rooftop 112. For example, a part of the rooftop 112 made of plastic, fabric, or polyvinyl chloride (PVC) may have lower durability parameter as compared to a part of the rooftop 112 made of cement or concrete. In an example, the durability parameter may also be determined based on shape, size, and structure of each of the one or more parts of the rooftop 112. For example, a rectangular shape of a part of the rooftop 112 may have higher durability parameter as compared to an A-shaped part of the rooftop 112. In addition, the durability parameter may also be determined based on environment conditions in a geographical region corresponding to the building. For example, a part of the rooftop 112 made of plastic or fabric may have lower durability parameter in bad weather condition (such as, high wind speed, high rainfall, low visibility, etc.) as compared to the part of the rooftop 112 made of plastic or fabric in good weather condition (such as, normal wind speed, no rainfall, clear visibility, etc.).

Further, as described in FIG. 4, the durability parameter may also be determined based on one or more objects placed on the one or more parts of the rooftop 112. For example, the durability parameter determined based on the construction material, size, shape, structure, and environment conditions may be updated when the system 102 identifies that one or more objects are placed on the rooftop 112. In an example, the updated durability parameter may be determined by the trained machine learning, by predicting a set of object attributes relating to the one or more objects. For example, the updated durability parameter for a part of the rooftop 112 having one or more object placed thereon may indicate weight tolerance of the part of the rooftop 112 after withstanding the weight of the one or more object placed.

In this manner, the durability parameter for different parts of the rooftop 112 of the building 110 is determined. Based on the determined durability parameter for different parts, durability parameter corresponding to different landing spots may also be determined. Further, a classification label may be assigned to different landing spots on same or different parts on the rooftop 112. For example, a safe landing zone classification label may be assigned to landing spots having corresponding durability parameter greater than a predefined threshold. Additionally, a risky landing zone classification label or no landing zone classification label may be assigned to landing spots having durability parameter lesser than the predefined threshold. In an example, such predefined threshold may be defined based on a set of UAV attributes, such as size and dimensions of the UAV 104, weight of the UAV 104, weight of the object 106 carried by the UAV 104, and the like.

FIG. 6 illustrates a flowchart for implementation of an exemplar method 600 for determining a rooftop type of the rooftop 112, in accordance with an example embodiment. In various embodiments, the mapping platform 114 or the system 102 may perform one or more portions of the method 600 and may be implemented in, for instance, a chip set including a processor and a memory. As such, the mapping platform 114 or the system 102 may provide means for accomplishing various parts of the method 600, as well as means for accomplishing embodiments of other processes described herein in conjunction with other components of the system 102. Although the method 600 is illustrated and described as a sequence of steps, its contemplated that various embodiments of the method 600 may be performed in any order or combination and need not include all of the illustrated steps.

At 602, location information associated with the UAV 104 is obtained. The processor 202 may be configured to obtain the location information from the sensors on-board the UAV 104, such as GPS sensor of the UAV 104, and/or one or more databases associated with the UAV 104. The location information may indicate a current geographical location of the UAV 104. Based on the location information, the system 102 may identify a geographic region corresponding to the UAV 104, i.e., a geographic region within which the UAV 104 is currently flying.

At 604, a first set of images and building data associated with the building 110 in proximity of the UAV 104 are obtained. The building 110 being in proximity to the current location of the UAV 104 is determined based on the location information and geo-referencing corresponding to plurality of buildings. In an example, the processor 202 obtains the first set of images and the building data from a database associated with the system 102, the database 114b, and/or a third-party database associated with the building 110. For example, the third-party database associated with the building 110 may be associated with a local authority, a construction company, and so forth. The first set of images may illustrate different views of the building 110 and corresponding rooftop 112 of the building 110. Moreover, the building data may include, for example, building location, building outline, building shape, building feature type, building roof type information, building shadows, building courtyard information, building blueprint, and building identifier. In certain cases, the processor 202 may obtain the first set of images from the UAV 104 wherein the UAV 104 may capture the first set of images during its operation. The UAV 104 may capture the first set of images using an imaging source, such as a camera, on-board the UAV 104.

In an example, obtaining the building data comprises querying a database for a functional class feature of each of the training data, unlabeled test samples, or a combination thereof, as at least one of the building data. In an example, a trained machine learning model may obtain the building data based on the functional class features of the training data, the unlabeled test samples, or combination thereof. As described above in FIG. 3, the machine learning model may be trained on the training data to identify relationships between functional class features and corresponding functional class values, based on corresponding label. The machine learning model may then be trained to identify rooftop type and durability parameter for the unlabeled test samples by extracting functional class values for functional class features of the unlabeled test samples.

At 606, a set of rooftop features for the rooftop 112 of the building 110 are extracted. In an example, the set of rooftop features may be extracted based on the first set of images and the building data, using the trained machine learning model. For example, the set of rooftop features may include a rooftop type and a durability parameter for the rooftop 112. In an example, the machine learning model may identify one or more part of the rooftop 112, based on processing of the first set of images and the building data. In particular, the one or more part may have different shape, color, texture, structure, etc. Based on such parameters, the trained machine learning may predict construction material of the one or more parts of the rooftop 112. In this manner, the machine learning model may identify the rooftop type of the rooftop 112 based on construction material used in construction of the corresponding one or more parts. Further, based on the rooftop type, or the construction materials, the machine learning material may determine durability parameter of the different parts of the rooftop 112. Based on a set of durability features associated with different construction materials and the construction material used for construction of the one or more parts of the rooftop, the machine learning model may determine the durability parameter for the one or more parts of the rooftop 112 of the building 110. For example, the durability parameter may indicate weight tolerance of the one or more parts of the rooftop 112. In an example, the durability parameter may also be determined based on environment-related attributes and road-related attributes.

At 608, a map database 114b may be updated. The map database may be updated to store the rooftop type and durability parameter for the rooftop 112. Based on the updated map database, the processor 202 may enable navigation of the UAV 104 to a landing spot on the rooftop for safe landing.

In an example, the processor 202 may obtain a set of UAV attributes relating to the UAV 104. In an example, the set of UAV attributes may include, for example, weight of the UAV 104, size and shape of the UAV 104, weight of the cargo 106 being carried by the UAV 104, size of the cargo 106 being carried by the UAV 104, and current remaining charge or battery information of the UAV 104. In an example, the processor 202 may identify one or more landing spots on the rooftop 112, for example, based on the rooftop type, building data and the first set of images.

Further, based on the rooftop type, the durability parameter, and the UAV attributes, the processor 202 may determine a classification label for one or more landing spots on the rooftop 112 of the building 110. For example, the classification label may be one of: a safe landing zone classification label, a risky landing zone label, and a no landing zone classification label.

In an example, when the rooftop 112 has a single part, i.e., made of only one construction material, one or more landing spots may be present on the same part across the rooftop 112. In such case, the classification label for the one or more landing spots may be similar or same, based on durability parameter of the construction material of the single part. However, it may be noted, the classification label for a first landing spot from the one or more landing spots may be different from the classification label for a second landing spot from the one or more landing spots when an object or an obstruction may be present at the first landing spot. In other words, the classification label for the one or more landing spots may be assigned based on object or obstruction present on the rooftop 112 or on any landing spot on the rooftop 112. In addition, a rooftop having two or more parts, i.e., having different parts made of different construction materials, a classification label for landing spot(s) in a first part may be different from a classification label for landing spot(s) in a second part. Such classification label for the landing spots on the first and the second part of the rooftop may be determine based on a durability parameter of the different construction materials of the different parts.

In this manner, the processor 202 may assign the classification label. Further, the processor 202 may determine one or more safe landing spots on the rooftop 112. For example, landing spot(s) having safe landing zone classification label assigned thereto may be identified as safe landing spot(s). In an example, a safe landing spot that is nearest to the current location of the UAV 104 is determined. Thereafter, the system 102 may generate navigation instructions for the UAV 102 to facilitate the landing on the UAV 104 on the nearest safe landing spot.

In an example, a landing output may be generated, based on the assigned classification label. For example, the classification label may indicate which landing spot(s) on the rooftop 112 may have safe landing zone label associated thereto. In an example embodiment, the landing output may include an exact location of the nearest safe landing spot on the rooftop 112 and a position (such as, angle, yaw, throttle, etc.) of the UAV 104 for landing the UAV 104 on the nearest safe landing spot. In certain cases, the landing output may also include navigation instructions for navigation of the UAV 104 from its current location to the rooftop 112. Thereafter, based on the landing output, the UAV 104 may land on the nearest safe landing spot on the rooftop 112. The landing output may be provided to the UAV 104 and/or a user associated with the UAV 104 for navigation and routing.

Accordingly, blocks of the methods 300, 400a, 400b, 500 and 600 support combinations of means for performing the specified functions and combinations of operations for performing the specified functions. It will also be understood that one or more blocks of the methods 300, 400a, 400b, 500 and 600, and combinations of blocks in the methods 300, 400a, 400b, 500 and 600, can be implemented by special purpose hardware-based computer systems which perform the specified functions, or combinations of special purpose hardware and computer instructions.

Alternatively, the system may comprise means for performing each of the operations described above. In this regard, according to an example embodiment, examples of means for performing operations may comprise, for example, the processor 202 and/or a device or circuit for executing instructions or executing an algorithm for processing information as described above.

On implementing the methods 300, 400a, 400b, 500 and 600 disclosed herein, the end result generated by the system 102 is a tangible application of the safe landing of the UAV. The landing of the UAV is of utmost importance to ensure enhanced operational time, reliable performance of the UAVs, and avoid any damage to the rooftop and the UAV.

Returning back to FIG. 1, a set of images associated with a geographic and/or three-dimensional region having buildings may include images of, for example, satellite view of the region, terrain view of the region, map view of the region, real-world buildings and point of interest structures in the region, road network in the region, rooftops and buildings in the region, air space of the region, and/or other interior and exterior area plans corresponding to places where an UAV can move or land in the region. To this end, the first set of images may include, for example, bird's eye view of the building 110 and the rooftop 112, satellite or map or terrain view of the building 110, images of the rooftop 112, and so forth. In an example, the images are pre-existing or publicly available images. For example, the images are originally formed or created for purposes other than generating a routable map. The pre-existing images may be generated by an entity separate from a developer of the platform for facilitating landing or for facilitating navigation and routing. The pre-existing images are available to the public or an entity for free or for a purchase price (e.g., online). Alternatively, self-generated images, images originally generated for creating a routable map, or non-public images may be used. In an example, the images are captured by UAV 104.

In some example embodiments, the system 102 may be coupled to a plurality of UAVs. In an example, the system 102 may be coupled to the UAV 104, via a communication interface and a network 116. In an embodiment, the system 102 may be coupled to one or more communication interfaces, for example, as a part of a routing system, a navigation app on-board the UAV 104, and the like. In some example embodiments, a user equipment is associated, coupled, or otherwise integrated with the UAV 104 as, for example, an advanced driver assistance system (ADAS), a personal navigation device (PND), a portable navigation device, an infotainment system and/or other device that may be configured to provide route guidance and navigation related functions to the UAV 104. In an example, the user equipment may include one or more sensors, a processor, a memory, and the communication interface. The processor, the sensors, the memory, and the communication interface may be communicatively coupled to each other.

In some example embodiments, the UAV 104 may include processing means such as a central processing unit (CPU), storage means such as on-board read only memory (ROM) and random access memory (RAM), acoustic sensors such as a microphone array, position sensors such as a GPS sensor, gyroscope, a LIDAR sensor, a proximity sensor, motion sensors such as accelerometer, an image sensor such as camera, a display enabled user interface such as a touch screen display, arms for carrying the object 106, and other components as may be required for specific functionalities of the UAV 104.

In one embodiment, the UAV 104, and the mapping platform 114 may be directly coupled to the system 102 via the network 116. In another embodiment, the UAV 104 may be coupled to the system 102 via an OEM (Original Equipment Manufacturer) cloud and the network 116. For example, the UAV 104 may be consumer vehicle and may be a beneficiary of the services provided by the system 102. In some example embodiments, the UAV 104 may serve the dual purpose of data gatherers and beneficiary devices.

In an example embodiment, the system 102 may be onboard the UAV 104, such as the system 102 may be a landing system installed in the UAV 104 for finding safe landing spots, initiating landing process and providing navigation instructions to reach the landing spots. In an example, the UAV 104 may be an autonomous vehicle, a semiautonomous vehicle, or a remotely-manually operated vehicle. In another example embodiment, the system 102 may be the processing server 114a of the mapping platform 114, and therefore may be co-located with or within the mapping platform 114. For example, the system 102 may be embodied as a cloud based service, a cloud based application, a cloud based platform, a remote server based service, a remote server based application, a remote server based platform, or a virtual computing system. In yet another example embodiment, the system 102 may be an OEM (Original Equipment Manufacturer) cloud. The OEM cloud may be configured to anonymize any data received by the system 102, such as from the user equipment or the UAV 104, before using the data for further processing, such as before sending the data to database 114b. In an example, anonymization of the data may be done by the mapping platform 114.

The system 102 may be communicatively coupled to the UAV 104, and the mapping platform 114, via the network 116. In an embodiment, the system 102 may be communicatively coupled to other components, for example, user equipment, and so forth, not shown on FIG. 1 via the network 116. The network 116 may be wired, wireless, or any combination of wired and wireless communication networks, such as cellular, Wi-Fi, internet, local area networks, or the like. In some embodiments, the network 116 may include one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks (for e.g. LTE-Advanced Pro), 5G New Radio networks, ITU-IMT 2020 networks, code division multiple access (CDMA), wideband code division multiple access (WCDMA), wireless fidelity (Wi-Fi), wireless LAN (WLAN), Bluetooth, Internet Protocol (IP) data casting, satellite, mobile ad-hoc network (MANET), and the like, or any combination thereof.

In accordance with an embodiment, the database 114b may be configured to receive, store, and transmit the data that may be collected from vehicles travelling throughout one or more geographic regions having one or more buildings and corresponding rooftops. In accordance with another embodiment, a developer may employ field personnel to travel by a vehicle, such as an aerial vehicle along one or more geographic regions to observe features and/or record information, such as the first set of images, building data, and map data. The map developers may crowd source geographic map data (or the map data), first set of images and the building data to accurately determine success rate for landing on a landing spot on a rooftop.

In some example embodiments, the database 114b may also be configured to receive, store, and transmit other sensor data and probe data including positional, speed, and temporal data received from the vehicles, such as aerial vehicles. The probe data may be used to determine traffic volume, such as air traffic volume, associated with movement of vehicles on or around one or more buildings. The traffic volume associated with the one or more buildings may correspond to the vehicles landing on each of the one or more buildings for a given time period. The probe count from the probe data may be observed within the given time period and projected to determine the traffic volume for that given time period. In accordance with an embodiment, the probe data may include, but are not limited to, real time speed (or individual probe speed), incident data, geolocation data, timestamp data, and historical pattern data.

The database 114b may further be configured to store the traffic-related data and topology and geometry-related data for a route network, road network, and/or air space routes, as map data. The map data may also include cartographic data, routing data, and maneuvering data. In accordance with an embodiment, the database 114b may be configured to receive the UAV attributes, the first set of images, the building data, the geographic data relating to buildings and the UAV 104, map data, and the topology and geometry-related attributes from external systems, such as, one or more of background batch data services, streaming data services, and third party service providers, via the network 116.

For example, the data stored in the database 114b may be compiled (such as into a platform specification format (PSF)) to organize and/or provide functions related to identifying landing spots, landing operation cost, landing success or fail and generate or update navigation-related functions and/or services, such as route calculation, route guidance, speed calculation, distance and travel time functions, navigation instruction generation, and other functions, by a navigation device, such as a UE. The navigation-related functions may correspond to navigation to a favored landing spots, navigation to a closest landing spot, re-routing of a route of operation, and other types of navigation. The compilation to produce the end user databases may be performed by a party or entity separate from the map developer. For example, a customer of the map developer, such as a navigation device developer or other end user device developer, may perform compilation on a received database 114b in a delivery format to produce one or more compiled navigation databases.

In some embodiments, the database 114b may be a master database configured on the side of the system 102. In accordance with an embodiment, a client-side map database may represent a compiled navigation database that may be used in or with end user devices (e.g., user equipment associated with the UAV 104) to determine landing spots on rooftops, such as the rooftop 112, for safe landing and provide navigation instructions, and/or map-related functions to navigate to the landing spot on the rooftop 112.

The system 102 may comprise suitable logic, circuitry, and interfaces that may be configured to detect buildings and corresponding rooftops for landing the UAV 104 and/or updating navigation instructions for routing the UAV 104 to a landing spots on a selected rooftop of a building.

Returning back to FIG. 2, the processor 202 may be embodied in a number of different ways. For example, the processor 202 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 202 may include one or more processing cores configured to perform independently. A multi-core processor may enable multiprocessing within a single physical package. Additionally or alternatively, the processor 202 may include one or more processors configured in tandem via the bus to enable independent execution of instructions, pipelining and/or multithreading. Additionally or alternatively, the processor 202 may include one or more processors capable of processing large volumes of workloads and operations to provide support for big data analysis. In an example embodiment, the processor 202 may be in communication with the memory 204 via a bus for passing information among components of the system 102.

The memory 204 may be non-transitory and may include, for example, one or more volatile and/or non-volatile memories. In other words, for example, the memory 204 may be an electronic storage device (for example, a computer readable storage medium) comprising gates configured to store data (for example, bits) that may be retrievable by a machine (for example, a computing device like the processor 202). The memory 204 may be configured to store information, data, content, applications, instructions, or the like, for enabling the system 102 to carry out various functions in accordance with an example embodiment of the present disclosure. For example, the memory 204 may be configured to buffer input data for processing by the processor 202. As exemplarily illustrated in FIG. 2, the memory 204 may be configured to store instructions for execution by the processor 202. As such, whether configured by hardware or software methods, or by a combination thereof, the processor 202 may represent an entity (for example, physically embodied in circuitry) capable of performing operations according to an embodiment of the present disclosure while configured accordingly. Thus, for example, when the processor 202 is embodied as an ASIC, FPGA or the like, the processor 202 may be specifically configured hardware for conducting the operations described herein.

Alternatively, as another example, when the processor 202 is embodied as an executor of software instructions, the instructions may specifically configure the processor 202 to perform the algorithms and/or operations described herein when the instructions are executed. However, in some cases, the processor 202 may be a processor specific device (for example, a mobile terminal or a fixed computing device) configured to employ an embodiment of the present disclosure by further configuration of the processor 202 by instructions for performing the algorithms and/or operations described herein. The processor 202 may include, among other things, a clock, an arithmetic logic unit (ALU) and logic gates configured to support operation of the processor 202. The network environment, such as, 100 may be accessed using the I/O interface 206 of the system 102. The I/O interface 206 may provide an interface for accessing various features and data stored in the system 102.

In some example embodiments, the I/O interface 206 may communicate with the system 102 and displays input and/or output of the system 102. As such, the I/O interface 206 may include a display and, in some embodiments, may also include a keyboard, a mouse, a joystick, a touch screen, touch areas, soft keys, one or more microphones, a plurality of speakers, or other input/output mechanisms. In one embodiment, the system 102 may comprise user interface circuitry configured to control at least some functions of one or more I/O interface elements such as a display and, in some embodiments, a plurality of speakers, a ringer, one or more microphones and/or the like. The processor 202 and/or I/O interface 206 circuitry may be configured to control one or more functions of one or more I/O interface 206 elements through computer program instructions (for example, software and/or firmware) stored on a memory 204 accessible to the processor 202.

In some embodiments, the processor 202 may be configured to provide Internet-of-Things (IoT) related capabilities to users of the system 102 disclosed herein. The IoT related capabilities may in turn be used to provide smart city solutions by providing real time landing output, big data analysis, and sensor-based data collection by using the cloud based mapping system for identifying the landing spots for safe landing and directing the UAV 104 to the identified safe landing spots. The I/O interface 206 may provide an interface for accessing various features and data stored in the system 102.

Some embodiments of the present disclosure are described with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout. Also, reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced item. Moreover, various features are described which may be exhibited by some embodiments and not by others. Similarly, various requirements are described which may be requirements for some embodiments but not for other embodiments. As used herein, the terms "data," "content," "information," and similar terms may be used interchangeably to refer to data capable of being displayed, transmitted, received and/or stored in accordance with embodiments of the present disclosure. Thus, use of any such terms should not be taken to limit the spirit and scope of embodiments of the present disclosure.

As defined herein, a "computer-readable storage medium," which refers to a non-transitory physical storage medium (for example, volatile or non-volatile memory device), may be differentiated from a "computer-readable transmission medium," which refers to an electromagnetic signal.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

I claim:

1. A system comprising:
a memory configured to store computer executable instructions; and
one or more processors configured to execute the instructions to:
obtain location information associated with a UAV;
obtain a first set of images and building data associated with a building in proximity of the UAV, based on the location information;
extract a set of rooftop features for a rooftop of the building, using the first set of images and the building data, the set of rooftop features comprising at least a rooftop type and a durability parameter for the rooftop; and
store the set of rooftop features in conjunction with the building data for the building in a map database.

2. The system of claim 1, wherein the one or more processors are configured to:
obtain a set of UAV attributes associated with the UAV; and
determine a classification label for one or more landing spots on the rooftop of the building for facilitating the landing of the UAV on the rooftop, based on the set of UAV attributes and the updated map database.

3. The system of claim 2, wherein the one or more processors are configured to:
provide the updated map database comprising the set of rooftop features for the rooftop of the building to the UAV; and
cause the UAV to assign a classification label to each of one or more landing spots on the rooftop.

4. The system of claim 3, wherein the one or more processors are configured to:
cause the UAV to identify one or more safe landing spots on the rooftop, based on the classification label; and
generate navigation instructions for facilitating landing of the UAV on a safe landing spot from the one or more safe landing spots.

5. The system of claim 3, wherein the classification label comprises at least one of: a safe landing zone, a risky landing zone, or a no landing zone.

6. The system of claim 2, wherein the one or more processors are configured to:
obtain consent information pertaining to landing of the UAV on the rooftop of the building; and
determine the one or more landing spots on the rooftop, based on the consent information.

7. The system of claim 1, wherein the one or more processors are configured to:
based on the first set of images and the building data, determine one or more construction materials used for construction of one or more parts of the rooftop; and
identify the rooftop type of the rooftop, based on the one or more construction materials.

8. The system of claim 1, wherein the one or more processors are configured to:
obtain a set of durability features corresponding to the one or more construction materials of the rooftop; and
based on the one or more construction materials used for construction of the one or more parts of the rooftop and the set of durability features, determine the durability parameter for the one or more parts of the rooftop of the building.

9. The system of claim 1, wherein the building data includes at least one of: building location, building outline, building shape, building feature type, building roof type information, building shadows, building courtyard information, building blueprint, and building identifier.

10. The system of claim 1, wherein the one or more processors are configured to:
extract the set of rooftop features for the rooftop of the building from the first set of images and the building data, using a trained machine learning model.

11. The system of claim 10, wherein the one or more processors are configured to:
identify one or more objects present on the rooftop of the building, using the first set of images and the trained machine learning model;

determine a set of object attributes associated with the one or more objects, using the building data, the first set of images and the trained machine learning model; and determine updated durability parameter for the rooftop of the building, based on the set of object attributes.

12. The system of claim 10, wherein to train the machine learning model, the one or more processors are configured to:

receive training data relating to one or more rooftops;

determine a plurality of features corresponding to one or more parts of the one or more rooftops, using the training data, the plurality of features indicating rooftop type and durability parameter associated with the one or more rooftops; and train the machine learning model to identify a rooftop type and a durability parameter for each of one or more unlabeled test samples, using the plurality of features and the training data.

13. The system of claim 1, wherein the UAV is configured to capture the first set of images of the building during a corresponding operation, using an imaging source associated therewith.

14. A method comprising:

obtaining location information associated with a UAV;

obtaining a first set of images and building data associated with a building in proximity of the UAV, based on the location information;

extracting a set of rooftop features for a rooftop of the building, using the first set of images and the building data, the set of rooftop features comprising at least a rooftop type and a durability parameter for the rooftop; and storing the set of rooftop features in conjunction with the building data for the building in a map database.

15. The method of claim 14, the method further comprising:

obtaining a set of UAV attributes associated with the UAV; and determining a classification label for one or more landing spots on the rooftop of the building for facilitating the landing of the UAV on the rooftop, based on the set of UAV attributes and the updated map database, wherein the classification label comprises at least one of: a safe landing zone, a risky landing zone, or a no landing zone.

16. The method of claim 14, the method further comprising:

providing the updated map database comprising the set of rooftop features for the rooftop of the building to the UAV;

causing the UAV to assign a classification label to each of one or more landing spots on the rooftop, wherein the classification label comprises at least one of: a safe landing zone, a risky landing zone, or a no landing zone;

causing the UAV to identify one or more safe landing spots on the rooftop, based on the classification label; and generating navigation instructions for facilitating landing of the UAV on a safe landing spot from the one or more safe landing spots.

17. The method of claim 15, the method further comprising:

obtaining consent information pertaining to landing of the UAV on the building;

determining the one or more landing spots on the rooftop, based on the consent information;

determining a nearest safe landing spot from the one or more landing spots nearest to a current location of the UAV; and generating navigation instructions to facilitate landing of the UAV to land on the nearest safe landing spot.

18. The method of claim 13, the method further comprising:

based on the first set of images and the building data, determining one or more construction materials used for construction of one or more parts of the rooftop;

identify the rooftop type of the rooftop, based on the one or more construction materials;

obtaining a set of durability features corresponding to the one or more construction materials of the rooftop; and based on the one or more construction materials used for construction of the one or more parts and the set of durability features, determining the durability parameter for the one or more parts of the rooftop of the building.

19. The method of claim 13, the method further comprising:

identifying one or more objects present on the rooftop of the building, using the first set of images and a trained machine learning model;

determining a set of object attributes associated with the one or more objects, using the building data, the first set of images and the trained machine learning model; and determining updated durability parameter for the rooftop of the building, based on the set of rooftop features and the set of object attributes.

20. A computer programmable product comprising a non-transitory computer readable medium having stored thereon computer executable instructions, which when executed by one or more processors, cause the one or more processors to carry out operations comprising:

obtaining a set of UAV attributes and location information associated with a UAV;

obtaining a first set of images and building data associated with a building in proximity of the UAV, based on the location information;

extracting a set of rooftop features for a rooftop of the building, using the first set of images, the building data and a trained machine learning model, the set of rooftop features comprising at least a rooftop type and a durability parameter for the rooftop;

storing the set of rooftop features in conjunction with the building data for the building in a map database; and determining a classification label for one or more landing spots on the rooftop of the building for facilitating the landing of the UAV on the rooftop, based on the set of UAV attributes and the updated map database.

* * * * *